United States Patent
Nagano et al.

(10) Patent No.: US 6,912,034 B2
(45) Date of Patent: Jun. 28, 2005

(54) LIQUID CRYSTAL DISPLAY DEVICE WITH LIGHT SHIELDING FILM AT BOUNDARY PORTION

(75) Inventors: Shingo Nagano, Kumamoto (JP); Masaya Mizunuma, Kumamoto (JP)

(73) Assignee: Advanced Display, Inc., Kunamoto (JP)

( * ) Notice: Subject to any disclaimer, the term of this patent is extended or adjusted under 35 U.S.C. 154(b) by 0 days.

(21) Appl. No.: 10/225,511

(22) Filed: Aug. 21, 2002

(65) Prior Publication Data

US 2003/0038910 A1 Feb. 27, 2003

(30) Foreign Application Priority Data

Aug. 22, 2001 (JP) ........................................ 2001-251506

(51) Int. Cl.[7] ............................................. G02F 1/1343
(52) U.S. Cl. ....................... 349/144; 349/111; 349/129; 349/138; 349/143; 349/147
(58) Field of Search ................. 349/111, 114, 349/129, 138, 143, 144, 147

(56) References Cited

U.S. PATENT DOCUMENTS

| 5,479,282 A | * | 12/1995 | Toko et al. | 349/123 |
| 5,995,176 A | * | 11/1999 | Sibahara | 349/44 |
| 6,680,769 B1 | * | 1/2004 | Lee et al. | 349/129 |

FOREIGN PATENT DOCUMENTS

| JP | 01-131506 | 5/1989 |
| JP | 02310534 | 12/1990 |
| JP | 08005524 | 1/1996 |
| JP | 08-005524 | 1/1996 |
| JP | 08050204 | 2/1996 |
| JP | 08050270 | 2/1996 |
| JP | 08-050204 | 3/1996 |
| JP | 08-050270 | 3/1996 |
| JP | 08-095030 | 4/1996 |
| JP | 08095030 | 4/1996 |
| JP | 08-095034 | 4/1996 |
| JP | 08095034 | 4/1996 |
| JP | 2809701 | 7/1998 |

* cited by examiner

*Primary Examiner*—Andrew Schechter

(57) ABSTRACT

The object of the present invention is to prevent a light leakage from a boundary portion between the areas where the voltage to be applied to the liquid crystal varies, and reducing a light leakage on a contact hole provided for electrically connecting the first pixel electrode and the second pixel electrode in the case where the areas where the voltage to be applied to the liquid crystal varies are composed of two-layered pixel electrodes, namely, a first pixel electrode and a second pixel electrode. A liquid crystal display device of the invention includes a plurality of pixels provided on an insulating substrate, a scanning line provided on the insulating substrate which scans the pixels, liquid crystal which is interposed between the insulating substrate and a counter substrate countered to the insulating substrate, and areas where a voltage to be applied to the liquid crystal varies in one pixel, and is characterized in that a light shielding film for preventing a light leakage due to alignment disorder of the liquid crystal is provided to a boundary portion of the areas where the voltage to be applied to liquid crystal varies.

20 Claims, 23 Drawing Sheets

LIQUID CRYSTAL DISPLAY DEVICE WITH LIGHT SHIELDING FILM AT BOUNDARY PORTION

BACKGROUND OF THE INVENTION

The present invention relates to an improvement of display quality of a liquid crystal display device. The invention particularly relates to prevention of a light leakage due to alignment disorder of liquid crystal caused by widening of a viewing angle.

As an operating mode of a liquid crystal display device, TN (Twisted Nematic) type is widely applied. The TN type has merits of easy gray scales display and a large aperture ratio, whereas has problems that when the viewing angle is changed, a change of transmittance is large and a viewing angle range is narrow. As one of methods of solving the problem that the viewing angle range of the TN type liquid crystal display device is narrow, a technique providing areas where strength of an electric field applied to the liquid crystal is different on a pixel is suggested. First, there will be explained briefly below the conventional technique. FIG. 16 is a plane view showing one pixel on an insulating substrate (hereinafter, referred to an array substrate) where a plurality of pixels, TFT (Thin Film Transistor) and the like are formed in the conventional liquid crystal display device. FIG. 17 is a sectional view taken along line E—E in FIG. 16.

In FIGS. 16 and 17, 1 is a first pixel electrode, 2 is a second pixel electrode, 3 is a gate line, 4 is a source line, 5 is a source electrode, 6 is a drain electrode, 7 is a semiconductor film, 9 is a storage capacitance line, 10 is a contact hole for connecting the first pixel electrode and the second pixel electrode, and 11 is a contact hole for connecting the second pixel electrode and the drain electrode. As shown in FIGS. 16 and 17, the pixel electrode of the conventional liquid crystal display device includes different two layers of the first pixel electrode 1 and the second pixel electrode 2. The second pixel electrode 2 is provided on a layer above an interlayer insulating film 15 provided on a layer above the first pixel electrode 1. Further, the second pixel electrode 2 is electrically connected with the drain electrode 6 by the contact hole 11 and is electrically connected with the first pixel electrode 1 by the contact hole 10. With such a structure, even in the case where the same voltage is applied to the first pixel electrode 1 and the second pixel electrode 2, areas where a voltage (electric field) to be applied to liquid crystal is different can be formed on one pixel. It becomes possible to widen the viewing angle range by varying the voltage to be applied to liquid crystal.

A conventional technique having different structure from the above one is disclosed in, for example, Japanese Patent No. 2809701. There will be explained below the conventional technique in the publication with reference to FIGS. 18 and 19. In FIGS. 18 and 19, the same reference numerals are given to the components which are the same as those in FIGS. 16 and 17, and a difference therebetween will be explained. FIG. 19 is a sectional view taken along line F—F in FIG. 18. In FIGS. 18 and 19, 12 is an insulating substrate, 16 is a liquid crystal, 17 is a counter substrate, 18 is a black matrix, 20 is a counter electrode, 21 is an alignment film on an array substrate side, 22 is an alignment film on the counter substrate side, 23 is a pixel electrode, 40 is an area which is not covered with the insulating film, 41 is a gate electrode, 42 is a thin film transistor, 43 is an insulating film, 44 is a low resistance semiconductor film, and 45 is an insulating film. As shown in FIGS. 18 and 19, the insulating film 45 on the pixel electrode 23 is removed in one pixel, and an area where the insulating film is formed and an area where the insulating film is not formed are provided on the pixel electrode. Thus, as is the case with FIGS. 16 and 17, the voltage to be applied to the liquid crystal can be varied in one pixel, and thus the viewing angle range can be widened.

There will be briefly explained below a mechanism for widening the viewing angle range. FIG. 20 shows a relationship between the voltage (V) to be applied to a liquid crystal and transmittance (T) in a normally white mode of the TN type liquid crystal display device. As shown in FIG. 20, in general there is a difference of approximately 1 to 2 V between a voltage at which transmittance starts to change (threshold voltage Vth) and a voltage at which a change of transmittance is almost finished (saturation voltage Vsat). In the liquid crystal display device, some voltage levels are provided between Vth and Vsat, thus gray scales display is executed. However, as shown in FIG. 20, in the TN type liquid crystal display device, in principle, when the viewing angle is changed, a V-T characteristic (voltage to be applied to the liquid crystal-transmittance characteristic) shifts and the transmittance changes greatly. As a result, the viewing angle range becomes narrow. However, when areas where the voltage to be applied to the liquid crystal varies are provided in one pixel, when the case having the first and second pixel electrodes in FIGS. 16 and 17 is exemplified, the V-T characteristics in the respective areas become as shown in FIG. 21(a) on the first pixel electrode and as shown in FIG. 21(b) on the second pixel electrode. An average of one pixel becomes a total sum of FIGS. 21(a) and 21(b) as shown in FIG. 21(c). For this reason, even if the viewing angle direction is changed, as shown in FIG. 22 a change of the transmittance in the case where the viewing angle is changed becomes small, and the viewing angle range can be widened.

As mentioned above, the areas where the voltage to be applied to the liquid crystal varies are provided in one pixel, thus the viewing angle can be widened. However, in the above-mentioned structure, since a voltage to be applied to the liquid crystal layer varies in a boundary portion between the areas where voltage to be applied to the liquid crystal varies in one pixel, when the case having the first and second pixel electrodes in FIGS. 16 and 17 is exemplified, equipotential surfaces such as Va, Vb and Vc shown in FIG. 23 are obtained in a vicinity of a pixel electrode opening portion, and an electric field component in a lateral direction is generated. In FIG. 23, the same reference numerals are given to the same components as those in FIGS. 16 through 19. Due to the lateral electric field in the boundary portion of the first and second pixel electrodes in FIG. 23, an alignment disorder of liquid crystal molecules positioned on this portion occurs. As a result, in the case, for example, where black display is executed in the liquid crystal display device in the normally white mode, a light leakage occurs on the boundary portion, and even when a sufficient voltage for black display is applied to the liquid crystal, the transmittance is not lowered sufficiently, and there arises a problem that the contrast is lowered.

In addition, in a structure which includes areas where the voltage to be applied to the liquid crystal varies in one pixel due to the two-layered pixel electrode composed of the first pixel electrode 1 and the second pixel electrode 2, as for the contact hole 10 for electrically connecting the first pixel electrode and the second pixel electrode, its level difference (level difference between the gate insulating film 14 and the interlayer insulating film 15) is large. Therefore, a light leakage which is caused by unsatisfactory alignment treatment due to rubbing occurs, and there also arises the problem that the contrast is lowered.

The present invention is devised in consideration of the above problem, in a structure which includes areas where voltage to be applied to a liquid crystal varies in one pixel, and it is an object of the present invention to provide a liquid crystal display device which a viewing angle is widened and contrast is high and fabricating method of the liquid crystal display device by preventing a light leakage from a boundary portion between the areas where the voltage to be applied to the liquid crystal varies, and reducing a light leakage on a contact hole provided for electrically connecting the first pixel electrode and the second pixel electrode in the case where the areas where the voltage to be applied to the liquid crystal varies are composed of two-layered pixel electrodes, namely, a first pixel electrode and a second pixel electrode.

SUMMARY OF THE INVENTION

A first liquid crystal display device of the present invention includes a plurality of pixels provided on an insulating substrate, a scanning line provided on the insulating substrate which scans the pixels, liquid crystal which is interposed between the insulating substrate and a counter substrate countered to the insulating substrate, and areas where a voltage to be applied to the liquid crystal varies in one pixel, and is characterized in that a light shielding film for preventing a light leakage due to alignment disorder of the liquid crystal is provided to a boundary portion of the areas where the voltage to be applied to liquid crystal varies.

A second liquid crystal display device of the present invention is characterized in that the pixels are composed of a first pixel electrode and a second pixel electrode connected via an insulating film in the areas where the voltage to be applied to the liquid crystal varies in one pixel, and the second pixel electrode is provided on a layer above the insulating film provided on a layer above the first pixel electrode as well as includes an area where it is not overlapped on the first pixel electrode in the first liquid crystal display device.

A third liquid crystal display device of the present invention is characterized in that the areas where the voltage to be applied to the liquid crystal varies in one pixel are formed that an insulating film is formed on pixel electrodes composing the pixels and a part of the insulating film on the pixel electrodes is removed in the first liquid crystal display device.

A fourth liquid crystal display device of the present invention is characterized in that the light shielding film is formed by a conductive film on the same layer as the scanning line in the first, second or third liquid crystal display device.

A fifth liquid crystal display device of the present invention is characterized in that the light shielding film is formed integrally with a storage capacitance line provided in parallel with the scanning line in the first, second or third liquid crystal display device.

A sixth liquid crystal display device of the present invention is characterized in that the light shielding film is formed in a position where a light leakage due to alignment disorder of the liquid crystal due to the alignment treatment is prevented in one of the first through fifth liquid crystal display device.

A seventh liquid crystal display device of the present invention is characterized in that a ratio of the voltage to be applied to a liquid crystal between the first pixel electrode and a counter electrode formed on a surface on the counter substrate in contact with the liquid crystal to the voltage to be applied to a liquid crystal between the second pixel electrode and the counter electrode falls within the range of 0.5:1.0 to 0.9:1.0 in the second liquid crystal display device.

An eighth liquid crystal display device of the present invention is characterized in that a ratio of the voltage to be applied to the liquid crystal between the pixel electrode where a part of the insulating film is removed and the counter electrode formed on the surface on the counter substrate in contact with the liquid crystal to the voltage to be applied to the liquid crystal between the insulating film on the pixel electrode and the counter electrode falls within the range of 0.5:1.0 to 0.9:1.0 in the third liquid crystal display device.

A ninth liquid crystal display device of the present invention is characterized in that the first pixel electrode is connected with the second pixel electrode by forming a contact hole on the insulating film, and the light shielding film for preventing the alignment disorder of the liquid crystal is provided to the contact hole in the second or seventh liquid crystal display device.

A tenth liquid crystal display device of the present invention is characterized in that the light shielding film for preventing the alignment disorder of the liquid crystal on the contact hole is formed by a black matrix on the counter substrate in the ninth liquid crystal display device.

An eleventh liquid crystal display device of the present invention is characterized in that the light shielding film for preventing the alignment disorder of the liquid crystal on the contact hole is formed by an opaque film on the insulating substrate in the ninth liquid crystal display device.

A twelfth liquid crystal display device of the present invention is characterized by further including alignment films which are provided respectively on surfaces of the insulating substrate and the counter substrate in contact with the liquid crystal and aligns the liquid crystal, polarizers which are provided respectively on surfaces of the insulating substrate and the counter substrate opposite to the surface in contact with the liquid crystal, and optical compensating films which are provided respectively between the polarizers and the insulating substrates, between the polarizers and the counter substrate where an alignment state of discotic liquid crystal is stabilized in one of the first through eleventh liquid crystal display device.

A thirteenth liquid crystal display device of the present invention is characterized in that a product of a birefringence index $\Delta n$ of the liquid crystal and a thickness d of the liquid crystal layer satisfies the relationship: $0.30 \ \mu m \leq \Delta n d \leq 0.50 \ \mu m$ in the twelfth liquid crystal display device.

A first liquid crystal display device manufacturing method of the present invention is directed to method for manufacturing a liquid crystal display device having a plurality of pixels provided on an insulating substrate, a scanning line provided on the insulating substrate to scan the pixels, and liquid crystal which is interposed between the insulating substrate and a counter substrate countered to the insulating substrate, the method including steps of forming areas where a voltage to be applied to the liquid crystal varies on one pixel, and forming a light shielding film for preventing a light leakage due to alignment disorder of the liquid crystal on a boundary portion of the areas where the voltage to be applied to the liquid crystal varies.

A second liquid crystal display device manufacturing method of the present invention included the step of forming the areas where the voltage to be applied to the liquid crystal varies on one pixel includes the steps of forming a first pixel electrode, forming an insulating film on a layer above the first pixel electrode, forming a contact hole on the insulating film, and forming a second pixel electrode which has an area where it is not overlapped on the first pixel electrode on a layer above the insulating film and is connected with the first pixel electrode via the contact hole in the first liquid crystal display device manufacturing method.

A third liquid crystal display device manufacturing method of the present invention is characterized in that the step of forming the areas where the voltage to be applied to the liquid crystal varies on one pixel includes the steps of forming a pixel electrode, forming an insulating film on a layer above the pixel electrode, and removing a part of the insulating film from the pixel electrode in the first liquid crystal display device manufacturing method.

A fourth liquid crystal display device manufacturing method of the present invention is characterized by further including the step of forming a light shielding film for preventing alignment disorder of the liquid crystal on the contact hole in the second liquid crystal display device manufacturing method.

BRIEF DESCRIPTION OF THE DRAWINGS

FIGS. 21(a) and 21(b) are integrated.

DETAILED DESCRIPTION

Embodiment 1

Figure 1:
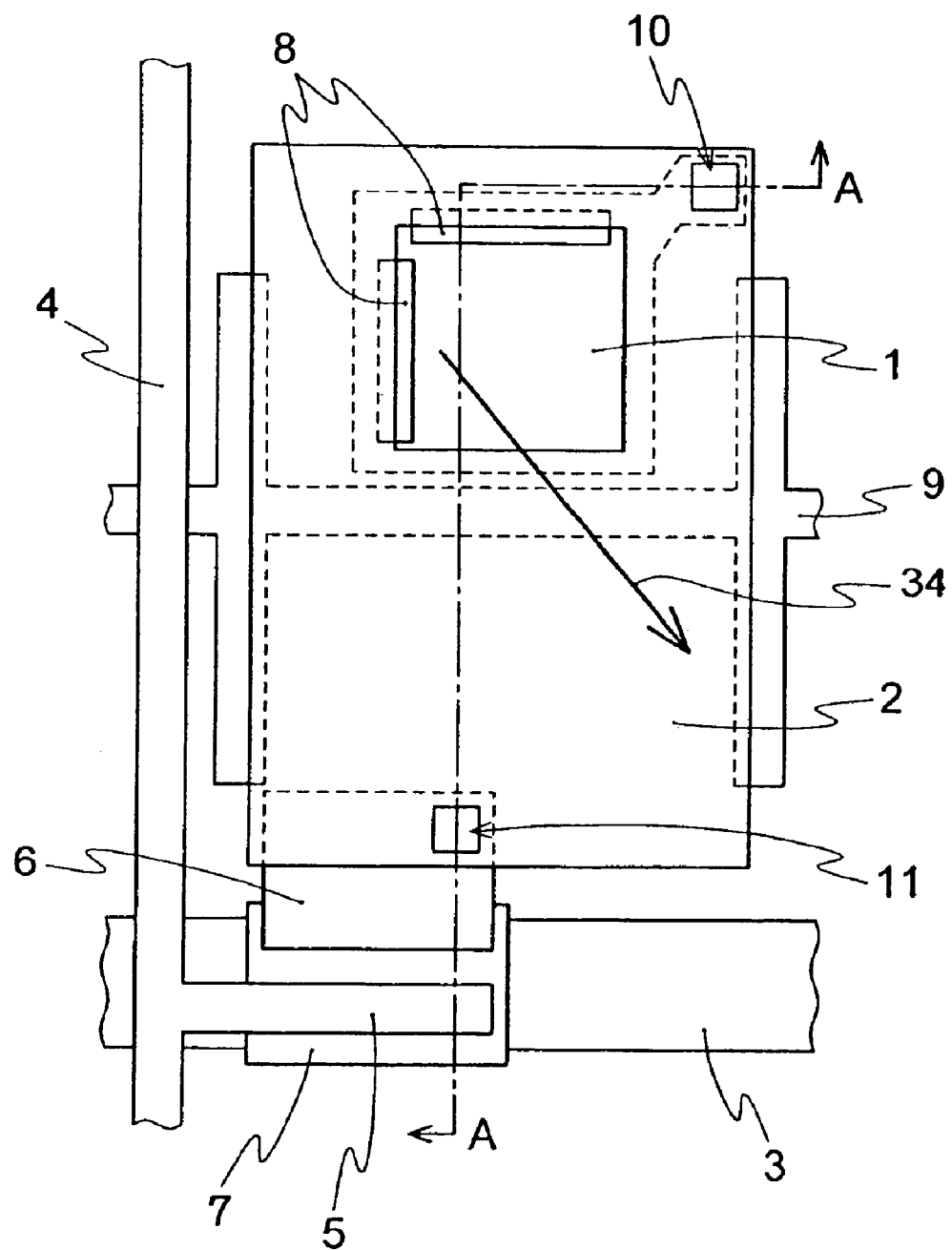
FIG. 1 is a plane view showing one pixel of a liquid crystal display device according to a first embodiment of the present invention.
Figure 2:
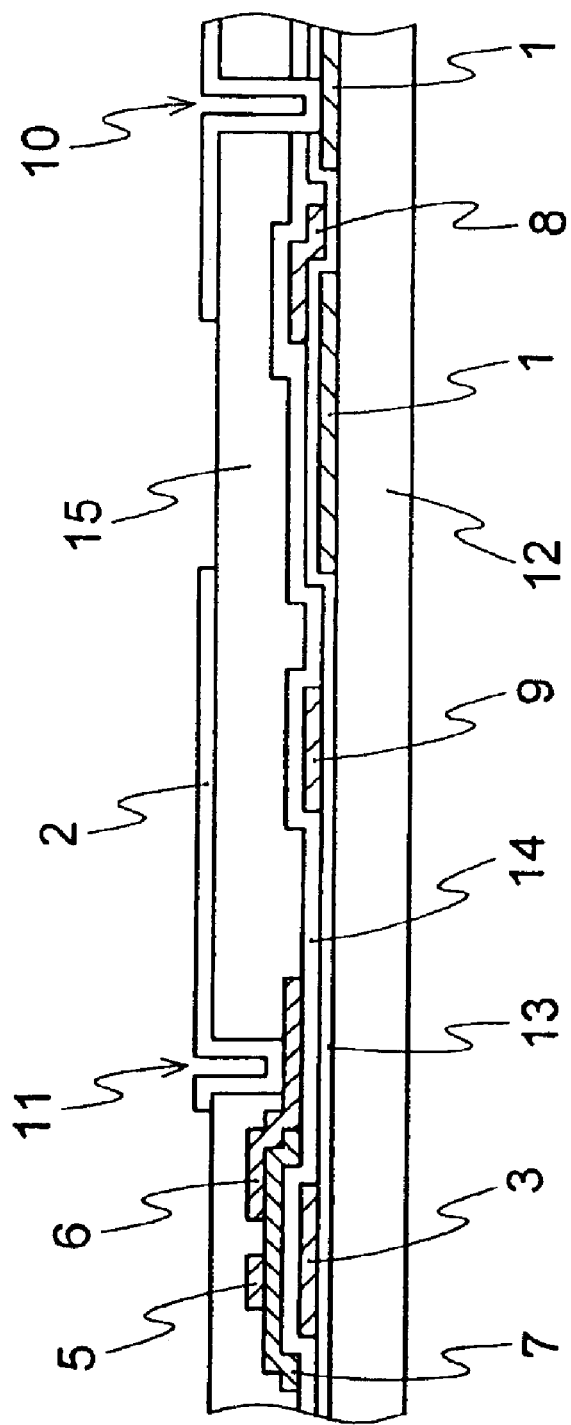
FIG. 2 is a sectional view taken along line A—A of an array substrate side in FIG. 1 according to the first embodiment of the present invention.
Figure 3:
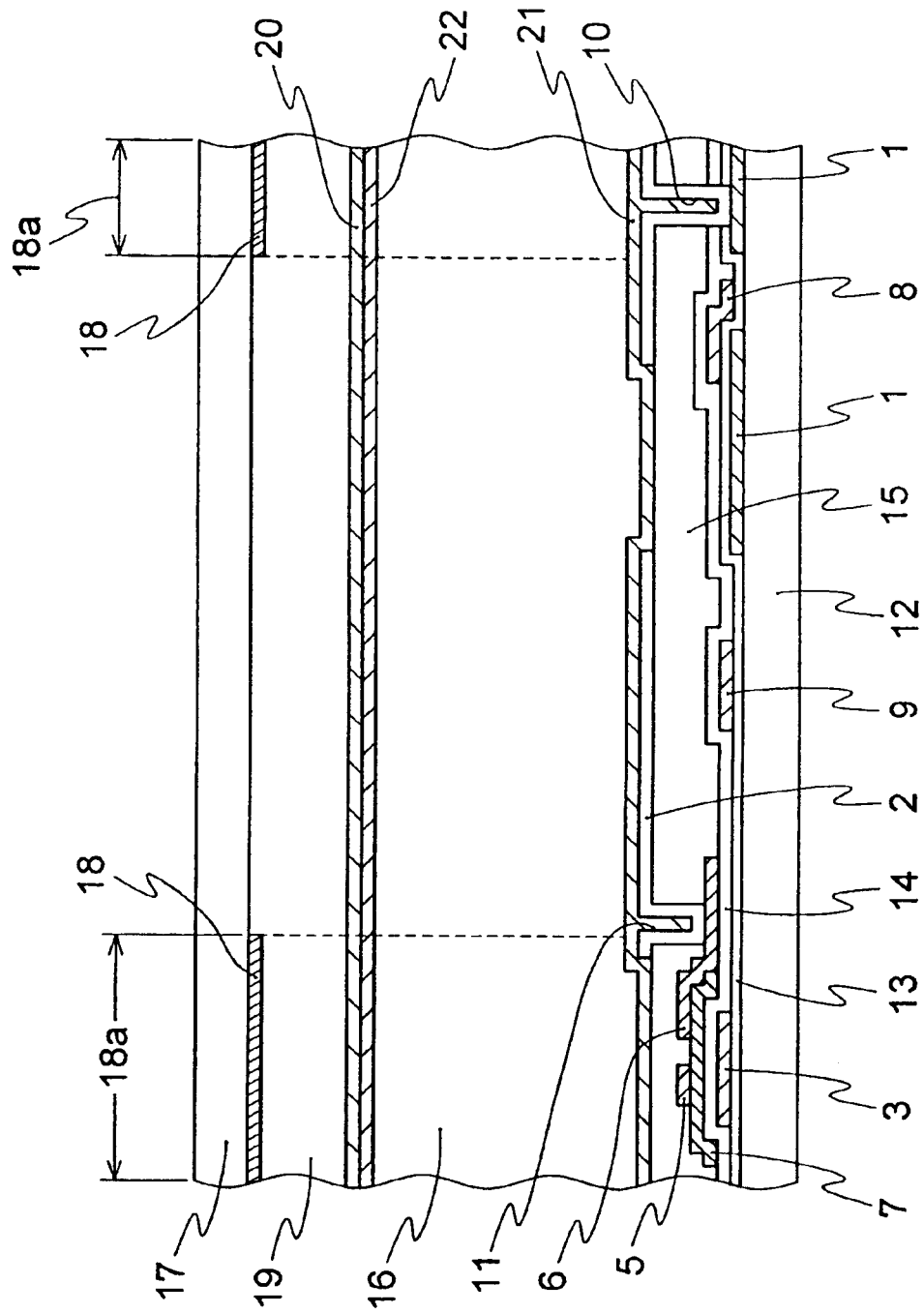
FIG. 3 is a sectional view taken along line A—A of the liquid crystal display device in FIG. 1 according to the first embodiment of the present invention.

FIGS. 1 through 3 are diagrams showing a liquid crystal display device according to the first embodiment of the present invention. FIG. 1 is a plane view showing one pixel, FIG. 2 is a sectional view taken along line A—A of an array substrate side in FIG. 1, and FIG. 3 is a sectional view taken along line A—A of the liquid crystal display device in FIG. 1. In FIG. 1, 1 is a first pixel electrode, 2 is a second pixel electrode, 3 is a scanning line for scanning a pixel (hereinafter, referred to a gate line), 4 is a source line, 5 is a source electrode, 6 is a drain electrode, 7 is a semiconductor film, 8 is a light shielding film, 9 is a storage capacitance line, 10 is a contact hole for connecting the first pixel electrode and the second pixel electrode, 11 is a contact hole for connecting the second pixel electrode and the drain electrode, 12 is an insulating substrate, 13 is an interlayer insulating film, 14 is a gate insulating film, 15 is an interlayer insulating film, 16 is liquid crystal, 17 is a counter substrate, 18 is a black matrix, 19 is a color filter material, 20 is a counter electrode, 21 is an alignment film on the array substrate side, 22 is an alignment film on the counter substrate side, 34 is a rubbing direction of the alignment film 21 on the array substrate side.

FIG. 1 is the plane view showing one pixel, and there will be explained below pixel manufacturing steps with reference to FIG. 2. First, a transparent conductive film made of ITO (Indium Tin Oxide), for example, is deposited on the insulating substrate 1 by sputtering and is patterned so that the first pixel electrode 1 is formed. Next, the interlayer insulating film 13 is deposited by CVD (Chemical Vapor Deposition) method or the like. Thereafter, the gate line 3 including the gate electrode composed of, for example, Al, Cr, Cu, Ta or Mo, metal alloy obtained by adding another substance to them or a laminated film made of them, and a conductive film to be the storage capacitance line 9 are patterned to be formed by photolithography and etching. At this time, in the present embodiment, also the light shielding film 8, which is formed on a boundary portion between areas where a voltage to be applied to the liquid crystal varies and which are composed of the first conductive film and a second conductive film, mentioned later, is formed by the conductive film on the same layer as the gate line. Here, the light shielding film 8 is electrically in a floating state.

Next, the gate insulating film 14 is formed by the CVD method or the like and further the semiconductor film 7 is deposited and patterned so that the semiconductor film 7 which is composed of, for example, an i-type semiconductor film and an n-type semiconductor film is formed. Thereafter, a conductive film made of Al, Cr, Cu, Ta or Mo, or metal alloy obtained by adding another substance to them, or a laminated film composed of different types of conductive films or a film where composition varies in a thicknesswise direction is deposited by sputtering and patterned so that the source line 4, the source electrode 5 and the drain electrode 6 are formed. After the source electrode and the drain electrode are patterned, for example etching is performed by using the source electrode and the drain electrode as masks, and a part of the semiconductor film on a channel portion of TFT (for example, a part of the n-type semiconductor film and the i-type semiconductor film) is removed so that TFT is formed. After the interlayer insulating film 15 is deposited by the CVD method or the like, the contact hole 11 for connecting the second pixel electrode 2, mentioned later, and the drain electrode 6, and the contact hole 10 for connecting the first pixel electrode 1 and the second pixel electrode 2 are formed. Finally the second pixel electrode as a transparent conductive film such as ITO is deposited by sputtering and patterned so that the second pixel electrode 2 is formed, and the array substrate is formed.

With the above structure, the liquid crystal display device, in which a light leakage due to lateral electric field in the boundary portion of the areas where a voltage to be applied to the liquid crystal varies in one pixel is prevented and the contrast is high, can be obtained. Moreover, since an area where the light leakage occurs is occasionally specified depending on a direction of alignment treatment such as rubbing, the light shielding film may be provided only to the area where the light leakage is remarkable. In the present embodiment, a preferred viewing direction of the liquid crystal display device is in a direction of six o'clock (lower endways direction on the sheet), the rubbing direction directs from the upper left side to the lower right side with respect to the pixel as shown in FIG. 1. For this reason, in the case of this rubbing direction, the light shielding film 8 is formed only on the boundary portion of the areas where the voltage to be applied to the liquid crystal varies on an upper stream side of the rubbing direction where reverse tilt occurs and the light leakage easily occurs. However, needless to say, the light shielding film may be provided not only to the boundary portion of the areas where the voltage to be applied to the liquid crystal varies and the light leakage due to the alignment treatment such as rubbing is prevent but also to a boundary area where the light leakage due to another factors is prevented.

In addition, in the present embodiment, the light shielding film 8 is formed on the same layer as the gate line 3 and the storage capacitance line 9, but may be formed on the same layer as the source line 4. In the case where the light shielding film 8 is formed on the same layer as the gate line 3 or the source line 4, the manufacturing steps are simplified, but also in the case where the light shielding film 8 is formed by a conductive film on a different layer from the gate line or the source line, the same effect is produced as long as it is an opaque film which can shield a light.

Further, the present embodiment shows an example that the light shielding film 8 is divided into two areas to be formed as shown in FIG. 1, but it may be formed into substantially L shape integrally with an area where the light leakage occurs depending on a direction of the alignment treatment such as rubbing.

FIG. 3 is a sectional view taken along line A—A in a state that the array substrate and the counter substrate are laminated. As shown in FIG. 3, after the second pixel electrode 2 is formed, the alignment film 21 of the array substrate side is applied onto the second pixel electrode 2. Similarly after the black matrix 18, the color filter material 19 and the counter electrode 20 are formed on a side of the counter substrate 17 which comes in contact with liquid crystal, the alignment film 22 of the counter substrate is applied onto the counter electrode 20, and the alignment films 21 and 22 are subject to the alignment treatment by the rubbing method, for example, such that the liquid crystal is twisted through 90°. The liquid crystal 16 is interposed, and at least one polarizer (not shown) is stuck to surfaces of the array substrate and the counter substrate opposite to the surfaces in contact with the liquid crystal such that their transmittance axes form approximately 90°, and the liquid crystal display device of normally white mode is finished.

Here, since a level difference of the contact hole 10 for connecting the first pixel electrode and the second pixel electrode (a level difference between the interlayer insulating films 13, 15 and the gate insulating film 14) is large, in order to shield a light leakage due to unsatisfactory alignment treatment by means of rubbing or the like, the contact hole 10 is provided in a position where the black matrix 18 and its light shielding area 18a on the counter substrate 17 are overlapped. The light shielding film which shields the light leakage due to the unsatisfactory alignment treatment is formed with the black matrix on the counter substrate 17 so that the manufacturing steps can be simplified without adding the manufacturing steps. At this time, from the viewpoint of an aperture ratio, it is preferable that the contact hole 10 is provided in one of vicinities of four corners of one pixel or at least the vicinities of the four sides of one pixel as shown in FIG. 1. With such a structure, also the light leakage on the contact hole 10 for connecting the first pixel electrode and the second pixel electrode due to the unsatisfactory alignment treatment by means of rubbing or the like can be prevented, and the liquid crystal display device with high contrast can be obtained.

In addition, the present embodiment shows both the shielding of the light leakage from the boundary portion of the areas where the voltage to be applied to the liquid crystal varies due to the first pixel electrode and the second pixel electrode by means of the light shielding film 8 and the shielding of the light leakage from the contact hole 10 by means of the black matrix 18. However, it is not always necessary to combine and use these techniques, and they may be used independently.

Embodiment 2

Figure 4:
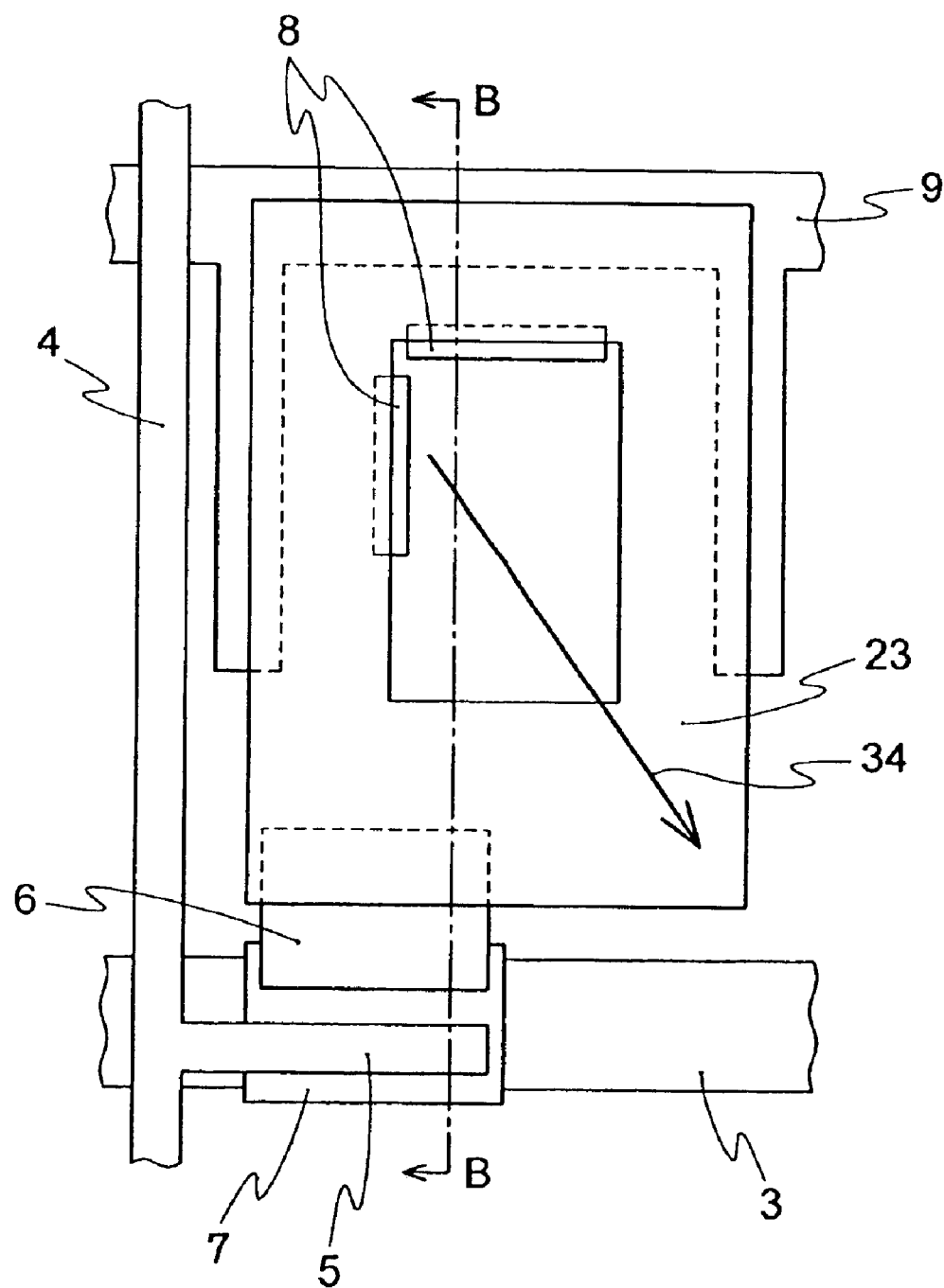
FIG. 4 is a plane view showing one pixel of the liquid crystal display device according to a second embodiment of the present invention.
Figure 5:
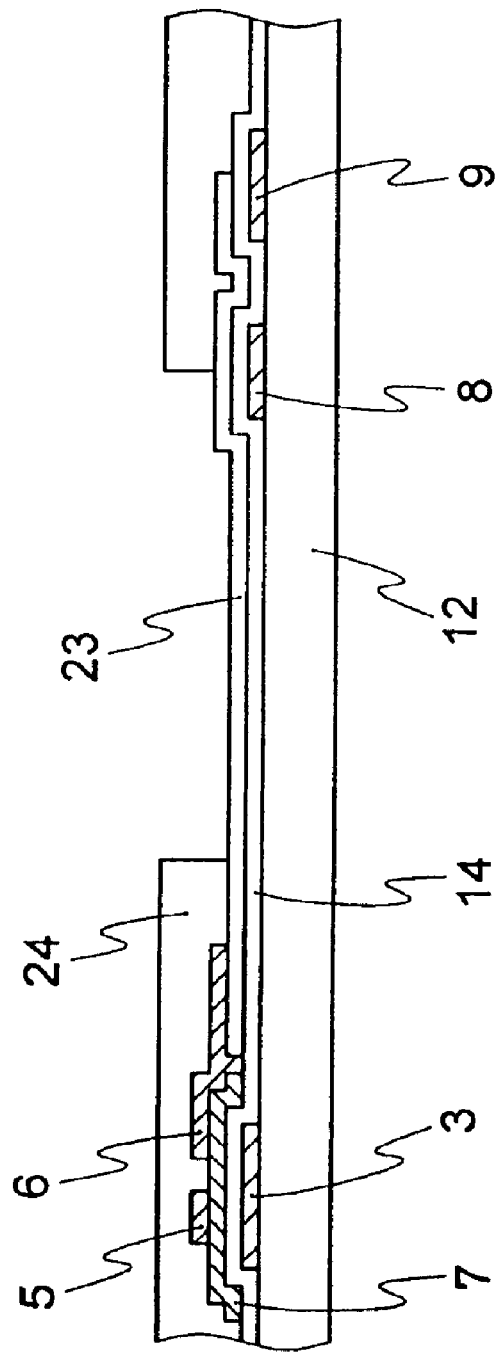
FIG. 5 is a sectional view taken along line B—B of the array substrate side in FIG. 4 according to the second embodiment of the present invention.

There will be explained below the embodiment 2 of the present invention with reference to FIGS. 4 and 5. FIG. 4 is a plane view showing one pixel of the liquid crystal display device according to the second embodiment of the present invention, and FIG. 5 is a sectional view taken along line B—B of the array substrate side in FIG. 4. In FIGS. 4 and 5, the same reference numerals are given to the same components as in FIGS. 1 through 3, and differences will be explained. In FIGS. 4 and 5, unlike the embodiment 1, a plurality of the pixel electrodes are not provided, and the areas where the voltage to be applied to the liquid crystal voltage varies are formed on one pixel by utilizing a level difference due to existence/non-existence of an insulating film on the pixel electrode.

The manufacturing steps in the present embodiment will be explained. First, the conductive film to be the gate line 3, the storage capacitance line 9 and the light shielding film 8, which is composed of, for example, Al, Cr, Cu, Ta or Mo, metal alloy obtained by adding another substance to them or a laminated film of them, is formed on the insulating substrate 12. Here, the light shielding film 8 is electrically in the floating state. The gate insulating film 14, and the semiconductor film 7 which is composed of, for example, the i-type semiconductor film and the n-type semiconductor film are formed and patterned. Thereafter, the pixel electrode 23 which is composed of a transparent conductive film such as ITO is formed. The conductive film which is composed of, for example, Al, Cr, Cu, Ta or Mo, or metal alloy obtained by adding another substance to them, or a laminated layer obtained by laminating different kinds of conductive films, or a film where composition differs in the thicknesswise direction is deposited by sputtering and patterned so that the source line 4, the source electrode 5 and the drain electrode 6 are formed. After the source electrode and the drain electrode are patterned, TFT is formed by removing a part of the semiconductor film on the channel portion of TFT (for example, a part of the n-type semiconductor film and the i-type semiconductor film) while using the source electrode and the drain electrode as masks. Thereafter, the insulating film 24 is deposited and patterned. At this time, a part of the insulating film on the pixel electrode 23 is removed.

With the above-mentioned structure, even in the structure that the areas where the voltage to be applied to the liquid crystal varies in one pixel are provided by the level difference due to existence/nonexistence of the insulating film on the one layered pixel electrode, the light leakage due to the alignment treatment such as rubbing can be prevented as is the case with the embodiment 1. However, needless to say, the light shielding film may be provided not only to the boundary portion of the areas where the voltage to be applied to the liquid crystal varies which prevents the light leakage due to the alignment treatment such as rubbing but to the area which prevents the light leakage due to another factors.

In addition, in the present embodiment, the light shielding film 8 is formed on the same layer as the gate line 3 and the storage capacitance line 9, but it may be formed on the same layer as the source line 4. In the case where the light shielding film 8 is formed on the same layer as the gate line 3 or the source line 4, the manufacturing steps are simplified, but also in the case where the light shielding film 8 is formed with the conductive film on the different layer from the gate line or the source line, the same effect is produced as long as the film is an opaque film which can shield a light.

Embodiment 3

Figure 6:
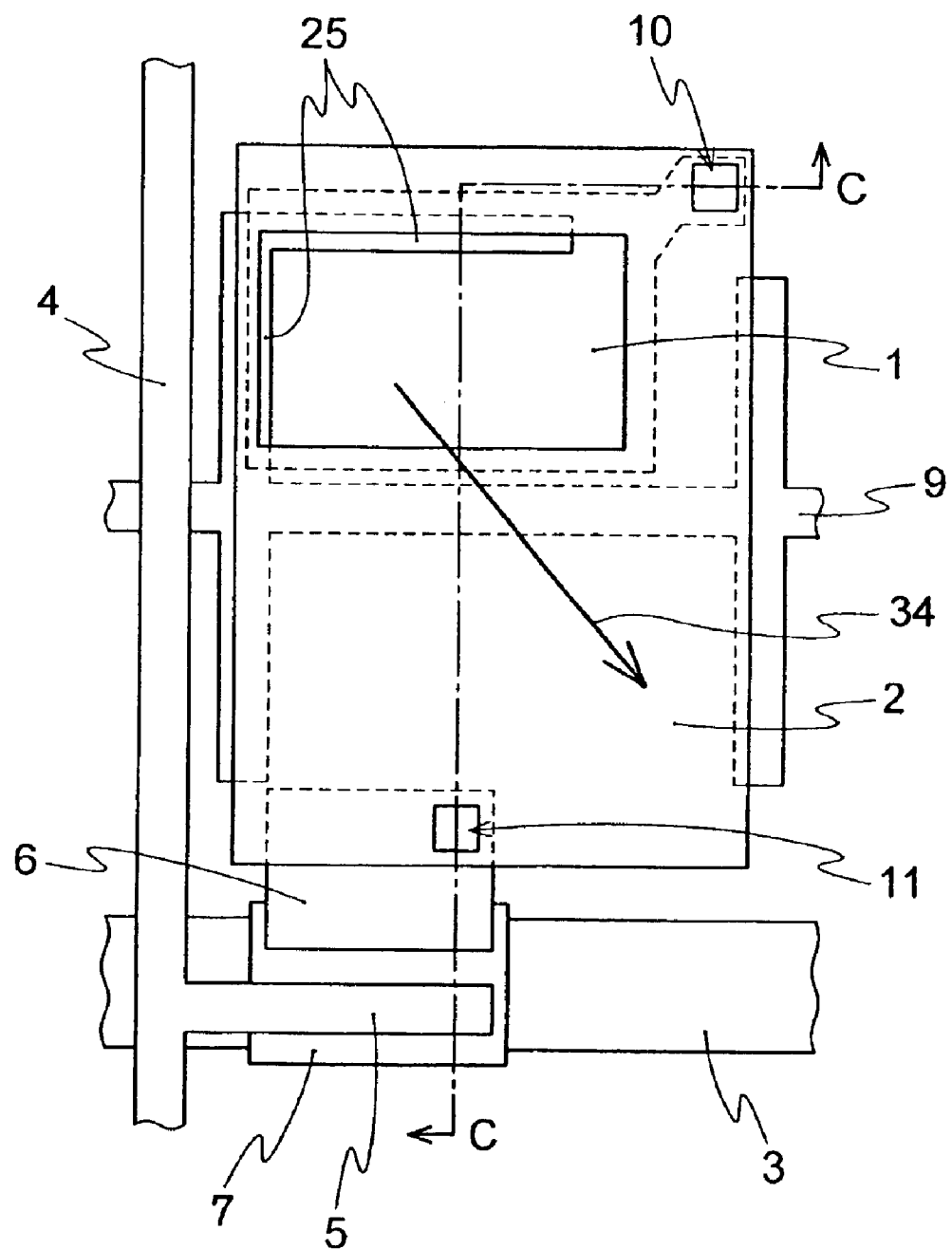
FIG. 6 is a plane view showing one pixel of the liquid crystal display device according to a third embodiment of the present invention.

There will be explained below the third embodiment of the present invention with reference to FIG. 6. FIG. 6 is a plane view showing one pixel of the liquid crystal display device according to the third embodiment of the present invention. In FIG. 6, the same reference numerals are given to the same components as in FIGS. 1 through 5, and differences will be explained. In FIG. 6, 25 is a light shielding film which is connected with the storage capacitance line 9. In the present embodiment, the storage capacitance line 9 and the light shielding film 8 of the first embodiment are formed integrally so that the light shielding film 25 for preventing light leakage is formed. Since the manufacturing steps in the present embodiment are the same as those in the first embodiment, the description thereof is omitted, and since the sectional view taken along line C—C in FIG. 6 is the same as FIGS. 2 and 3, the description thereof is omitted.

With the above structure, the same effect as that in the first embodiment is produced, and the manufacturing steps are simplified and storage capacitance formed between the storage capacitance line and the pixel electrodes can be secured sufficiently. Furthermore, a decrease in an area of the light transmitting portion in one pixel is suppressed, and the viewing angle can be improved without decreasing the aperture ratio.

Embodiment 4

Figure 7:
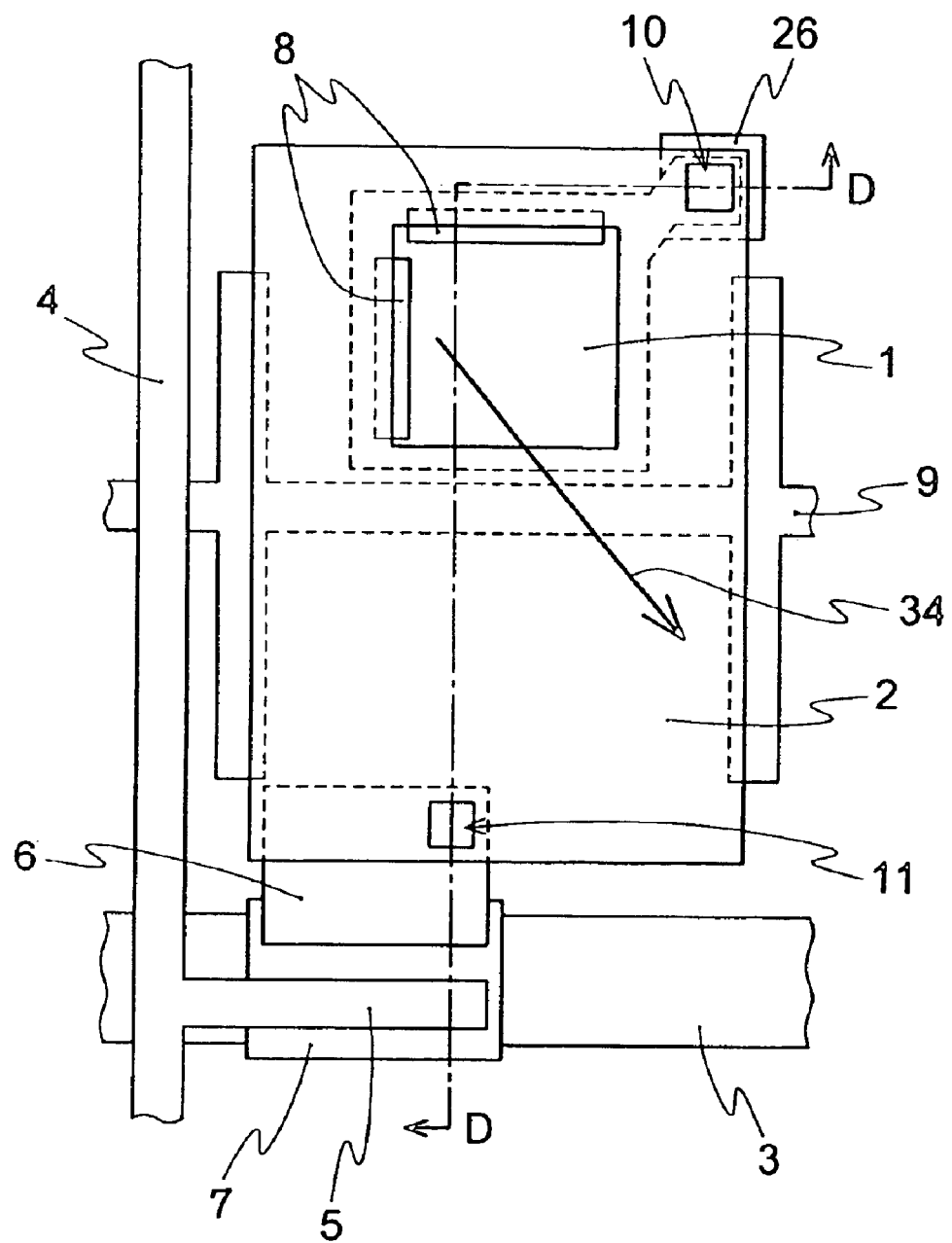
FIG. 7 is a plane view showing one pixel of the liquid crystal display device according to a fourth embodiment of the present invention.
Figure 8:
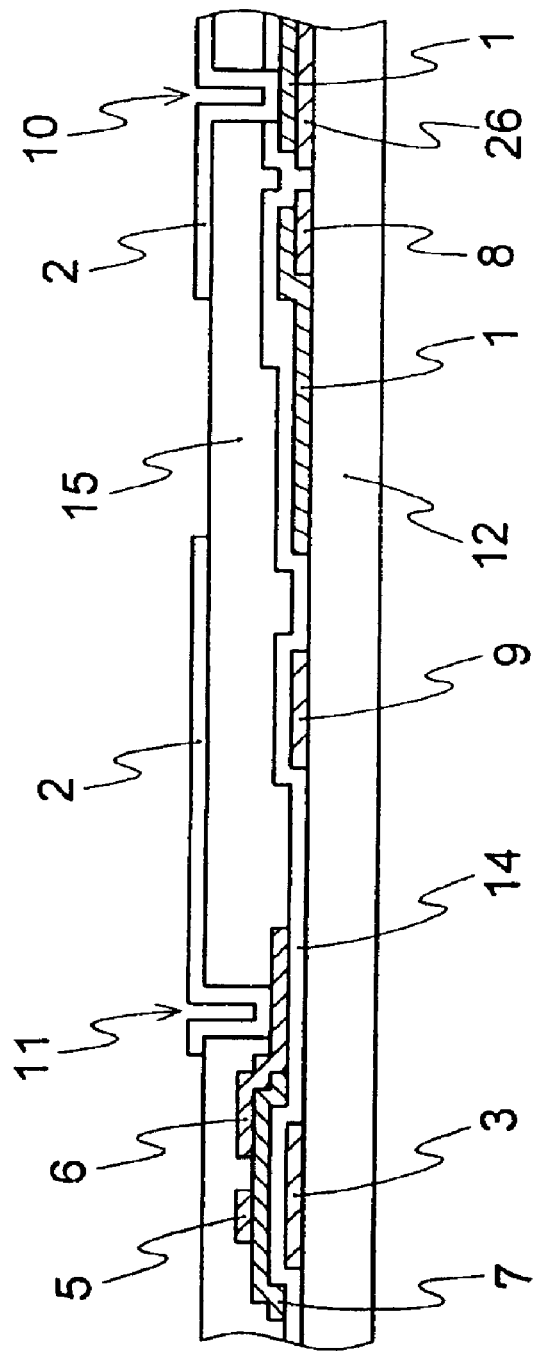
FIG. 8 is a sectional view taken along line D—D of the array substrate side in FIG. 7 according to the fourth embodiment of the present invention.

There will be explained below the fourth embodiment of the present invention with reference to FIGS. 7 and 8. FIG. 7 is a plane view showing one pixel of the liquid crystal display device according to the fourth embodiment of the present invention, and FIG. 8 is a sectional view taken along line D—D of the array substrate side in FIG. 7. In FIGS. 7 and 8, the same reference numerals are given to the same components as in FIGS. 1 through 6, and differences will be explained. In FIGS. 7 and 8, 26 is a light shielding film of the contact hole. In the present embodiment, unlike the first embodiment, the light shielding film on the contact hole is formed by an opaque film of the array substrate side.

FIG. 7 is a plane view showing one pixel, and firstly the manufacturing steps thereof will be explained with reference to FIG. 8. The gate line 3, the storage capacitance line 9, the light shielding film 8 and the light shielding film 26 on the contact hole which are composed of Al, Cr, Cu, Ta or Mo, or metal alloy obtained by adding another substance to them or a laminated film of them are patterned to be formed on the insulating substrate 1 by photolithography and etching. At this time, the light shielding film 8 is formed on the boundary portion of the areas where the voltage to be applied to the liquid crystal varies by means of the first pixel electrode and the second pixel electrode, mentioned later, and the light shielding film 26 is formed on the contact hole for connecting the first pixel electrode and the second pixel electrode. Next, a transparent conductive film made of, for example, ITO is deposited by sputtering and patterned so that the first pixel electrode 1 is formed. The gate insulating film 14 is deposited by the CVD method or the like, and the semiconductor film 7 is deposited and patterned so that the semiconductor film 7 composed of, for example, the i-type semiconductor film and the n-type semiconductor film is formed.

Thereafter, the conductive film made of, for example, Al, Cr, Cu, Ta or Mo, or the metal alloy obtained by adding another substance to them, a laminate film obtained by laminating different types of conductive films, or a film where composition varies in the thicknesswise direction is deposited by sputtering and patterned so that the source line 4, the source electrode 5 and the drain electrode 6 are formed. After the patterns of the source electrode and the drain electrode are formed, TFT is formed by removing a part of the semiconductor film on the channel portion of TFT (for example, a part of the n-type semiconductor film and the i-type semiconductor film) while using the source electrode, the drain electrode are etched as masks. After the interlayer insulating film 15 is deposited, the contact hole 11 for connecting the pixel electrode 2 and the drain electrode 6, and the contact hole 10 for connecting the first pixel electrode 1 and the second pixel electrode 2 are formed. Finally, the second pixel electrode as the transparent conductive film such as ITO is deposited by sputtering so as to be patterned. As a result, the second pixel electrode 2 is formed so that the array substrate is formed.

Here, unlike the first and second embodiments, the light shielding film 8 is electrically connected with the first pixel electrode 1, and the providing position of the light shielding film 8 is the same as the embodiment 1. With the above structure, the same effect as the embodiment 1 can be produced.

In addition, the present embodiment shows the example that the light shielding film 26 of the contact hole is formed on the same conductive film as the gate line 3, but it may be formed on the same layer as the source line 4. In the case where the light shielding film 26 is formed on the same layer as the gate line 3 or the source line 4, the manufacturing steps are simplified. However, also in the case where the light shielding film 26 of the contact hole is formed on a conductive film different from the gate line or the source line such as a layer above the second pixel electrode 2, the same effect is produced as long as it is an opaque film which can shield a light.

Further, the present embodiment shows both the shielding of the light leakage from the boundary portion of the areas where the voltage to be applied to the liquid crystal varies due to the first pixel electrode and the second pixel electrode by means of the light shielding film 8 and the shielding of the light leakage from the contact hole 10 by means of the light shielding film 26. It is not always necessary to combine and use these techniques, and they may be used independently.

The present invention was explained based on the first through fourth embodiments. A thickness of the insulating film formed between the first pixel electrode and the second pixel electrode changes normally due to dielectric constant anisotropy of liquid crystal to be used for the TN mode and dielectric constant of the insulating film material, a thickness of the insulating film formed on the second pixel electrode and a relationship of the dielectric constants, but it can be represented by a voltage (electric field) ratio of a first voltage to be applied to liquid crystal between the first pixel electrode and the counter electrode opposing via the liquid crystal to a second voltage to be applied to the liquid crystal between the second pixel electrode and the counter electrode. When ratio of the voltage to be applied to the liquid crystal between the first pixel electrode and the counter electrode to the voltage to be applied to the liquid crystal between the second pixel electrode and the counter electrode is smaller than 0.5:1.0, the contrast is lowered, while the viewing angle cannot be improved sufficiently, if the ratio is larger than 0.9:1.0. For that reason, it is preferable that the ratio falls within the rage of 0.5:1.0 to 0.9:1.0. Like the case of FIG. 4 of the second embodiment, in the case where a part of the insulating film is removed from the pixel electrode and the areas where the voltage to be applied to the liquid crystal varies are provided to one pixel, it is preferable that the ratio of the voltage to be applied to the liquid crystal of the voltage to be applied to the liquid crystal between the pixel electrode where a part of the insulating film is removed and the counter electrode to the voltage to be applied to the liquid crystal between the insulating film on the pixel electrode and the counter electrode falls within the range of 0.5:1.0 to 0.9:1.0.

In addition, the present invention is not limited to the layer structure and the material structure in the first through fourth embodiments, and various modifications are possible within the rage that the present invention does not deviate from the gist.

In addition, the first through fourth embodiments show the case where two areas where the voltage to be applied to liquid crystal varies are formed as an example, but three or more areas may be formed, and also in this case, the light shielding film is formed in the position where the light leakage due to the alignment treatment such as rubbing is prevented so that the same effect can be produced.

Further, the first through fourth embodiments explain the display device using the TN type liquid crystal, but the present invention is not limited to this and can be applied to display devices using various liquid crystals such as field sequential type.

Embodiment 5

Figure 9:
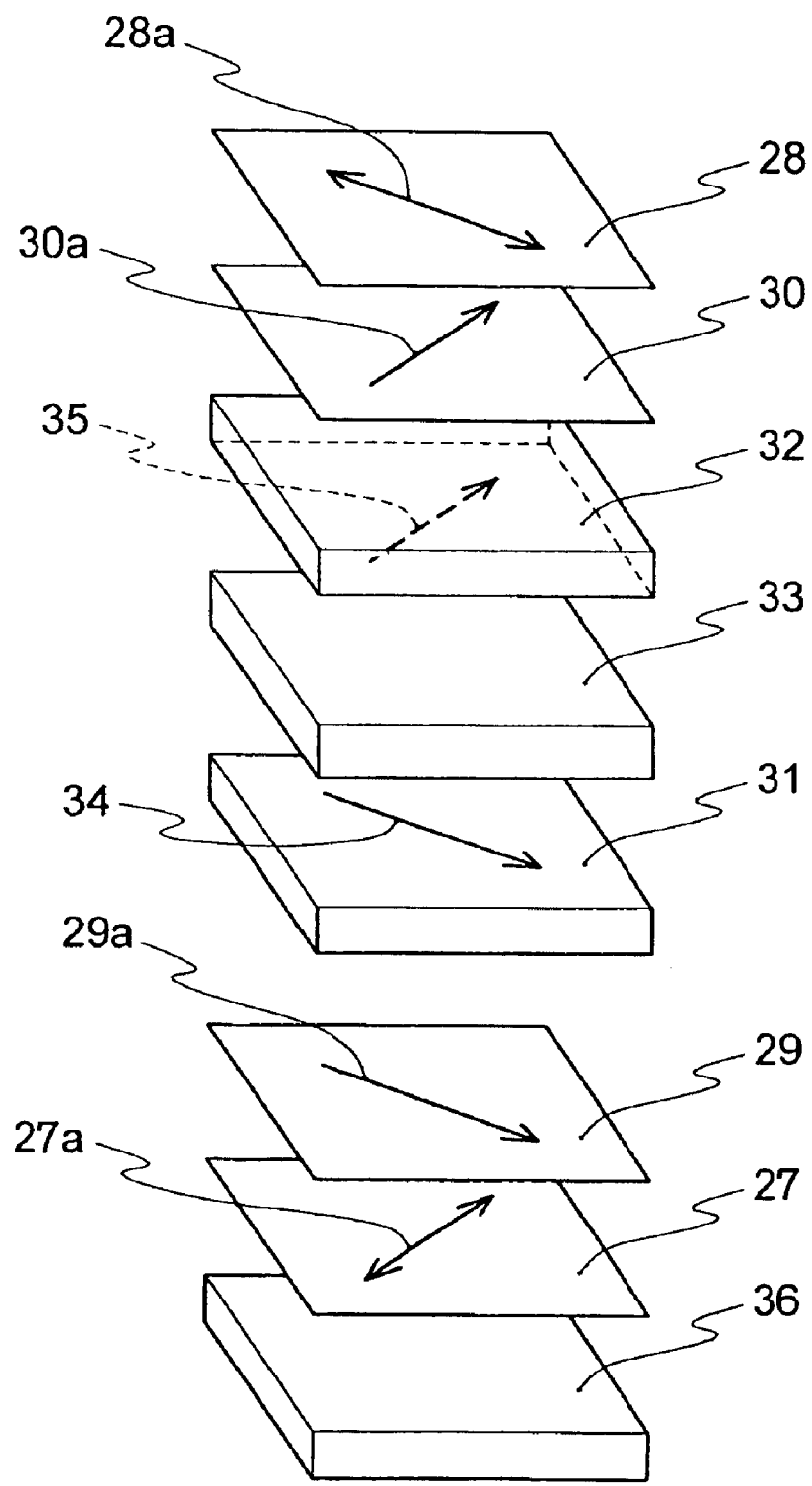
FIG. 9 is a structural diagram of the liquid crystal display device according to a fifth embodiment of the present invention.
Figure 10:
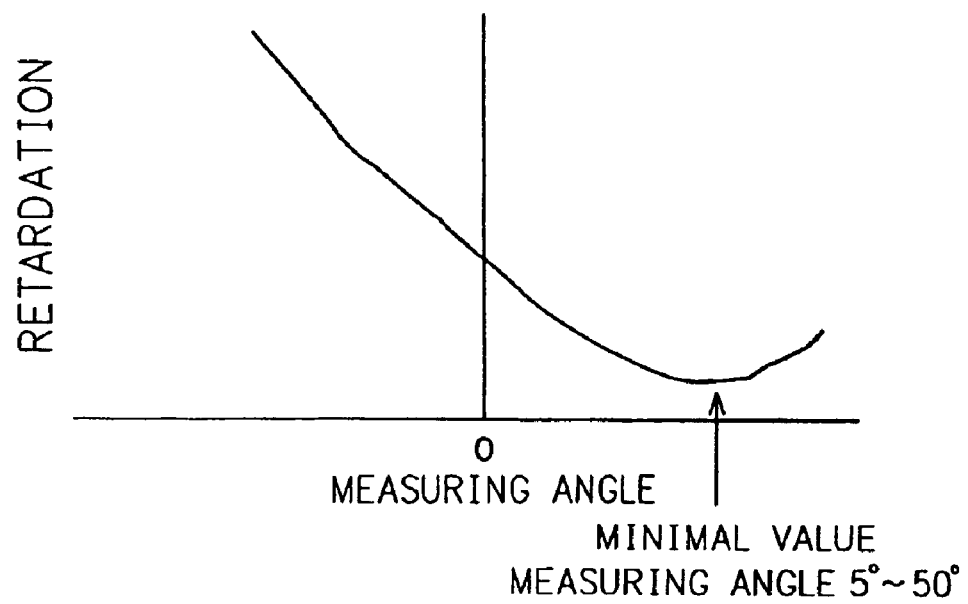
FIG. 10 is a diagram showing a relationship between a retardation and a measuring angle of an optical compensating film according to the fifth embodiment of the present invention.
Figure 11:
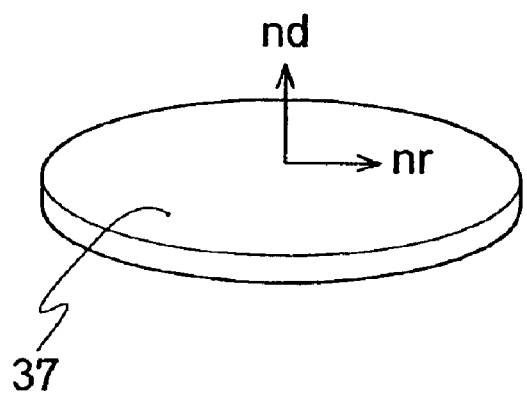
FIG. 11 is a diagram showing refractive indexes in a radial direction and a thicknesswise direction of discotic liquid crystal molecules according to the fifth embodiment of the present invention.
Figure 12A:
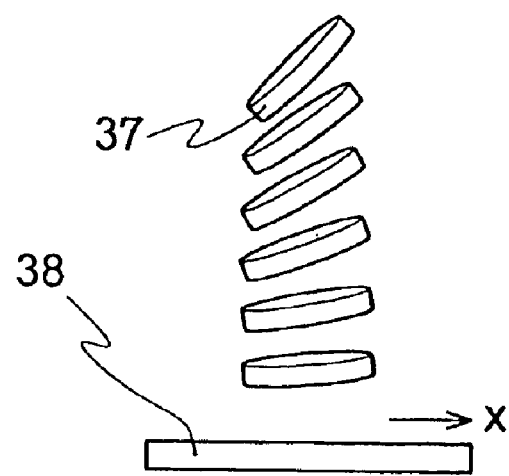
FIG. 12(a) is a structural diagram of the optical compensating film according to the fifth embodiment of the present invention.
Figure 12B:
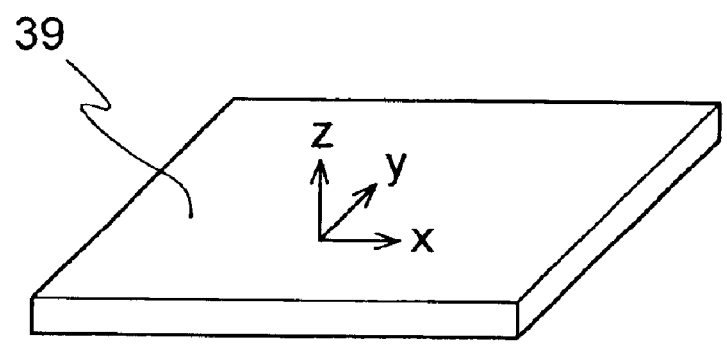
FIG. 12(b) is a diagram showing refractive indexes of inplane and normal direction of the optical compensating film according to the fifth embodiment of the present invention.
Figure 13:
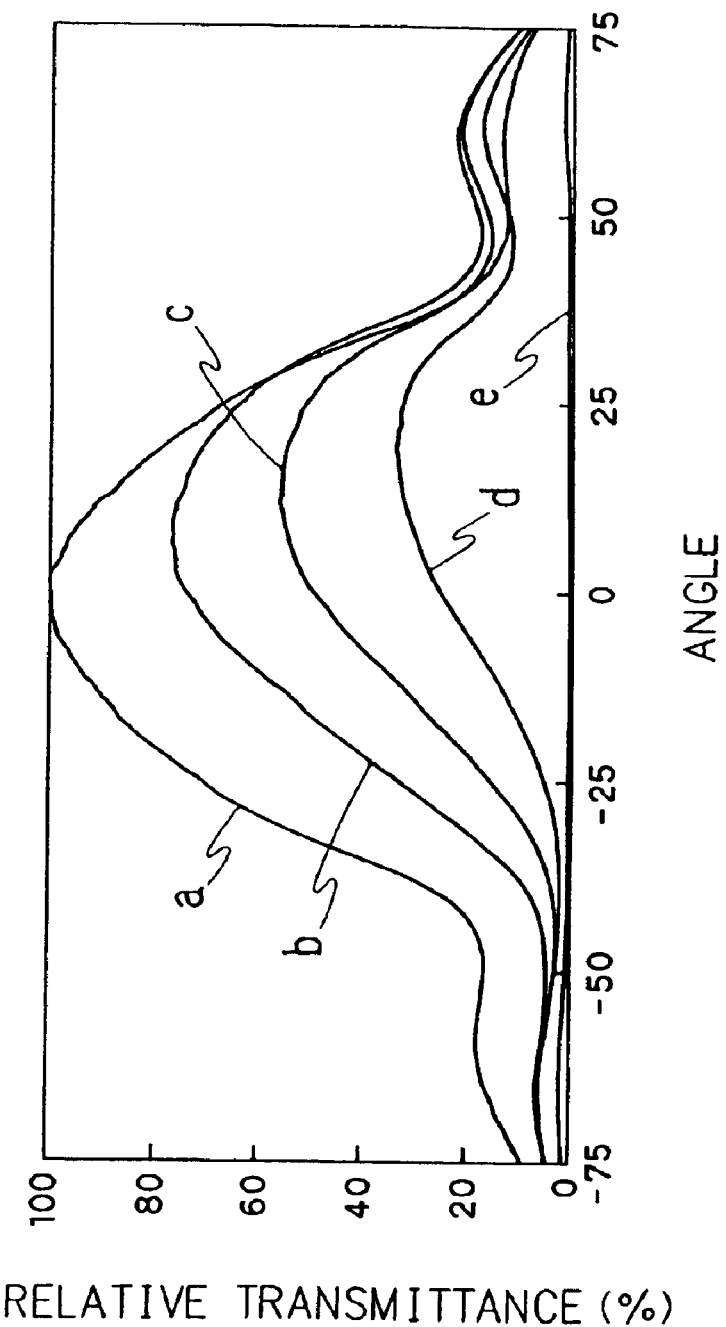
FIG. 13 is a diagram showing an angle dependence of a relative transmittance of the liquid crystal display device according to the fifth embodiment of the present invention.
Figure 14:
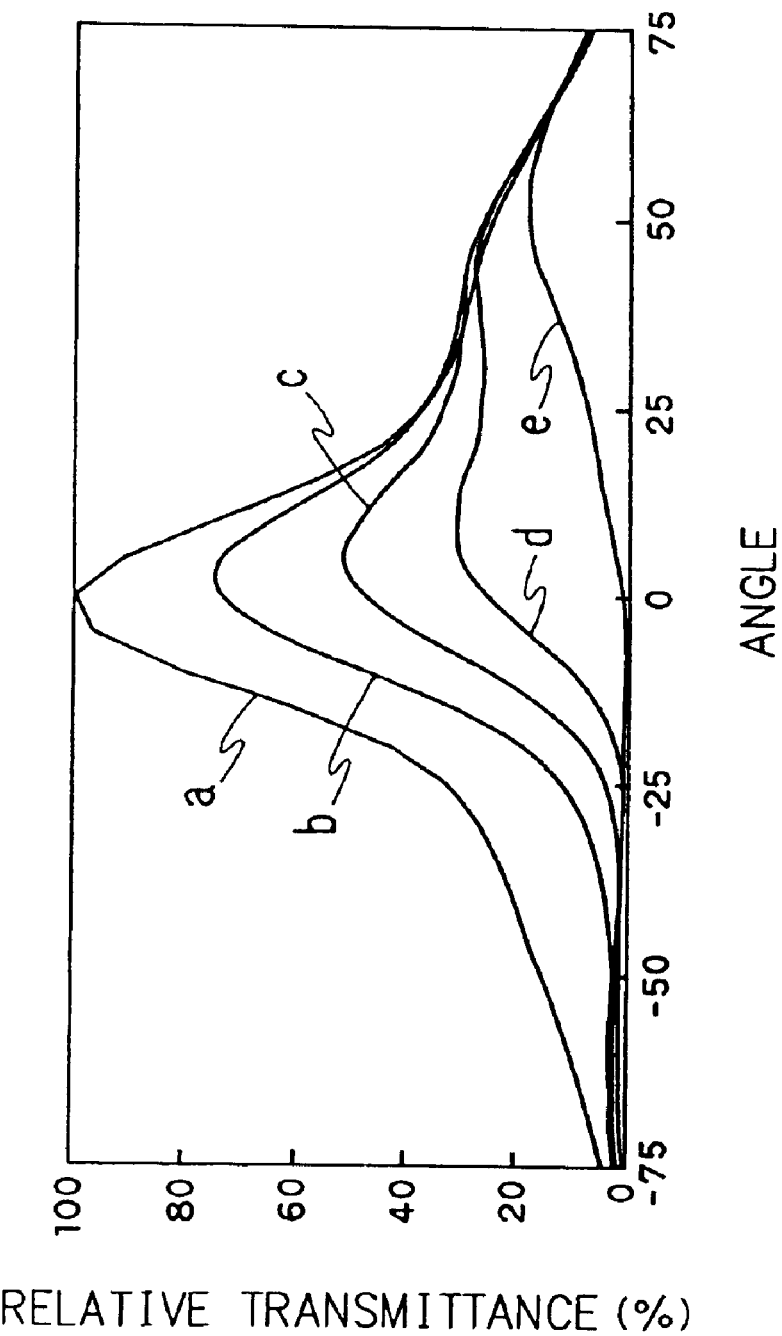
FIG. 14 is a diagram showing an angle dependence of the relative transmittance in the liquid crystal display device having a structure that the optical compensating film is not provided and the voltage to be applied to the voltage to be applied to a liquid crystal varies in one pixel.
Figure 15:
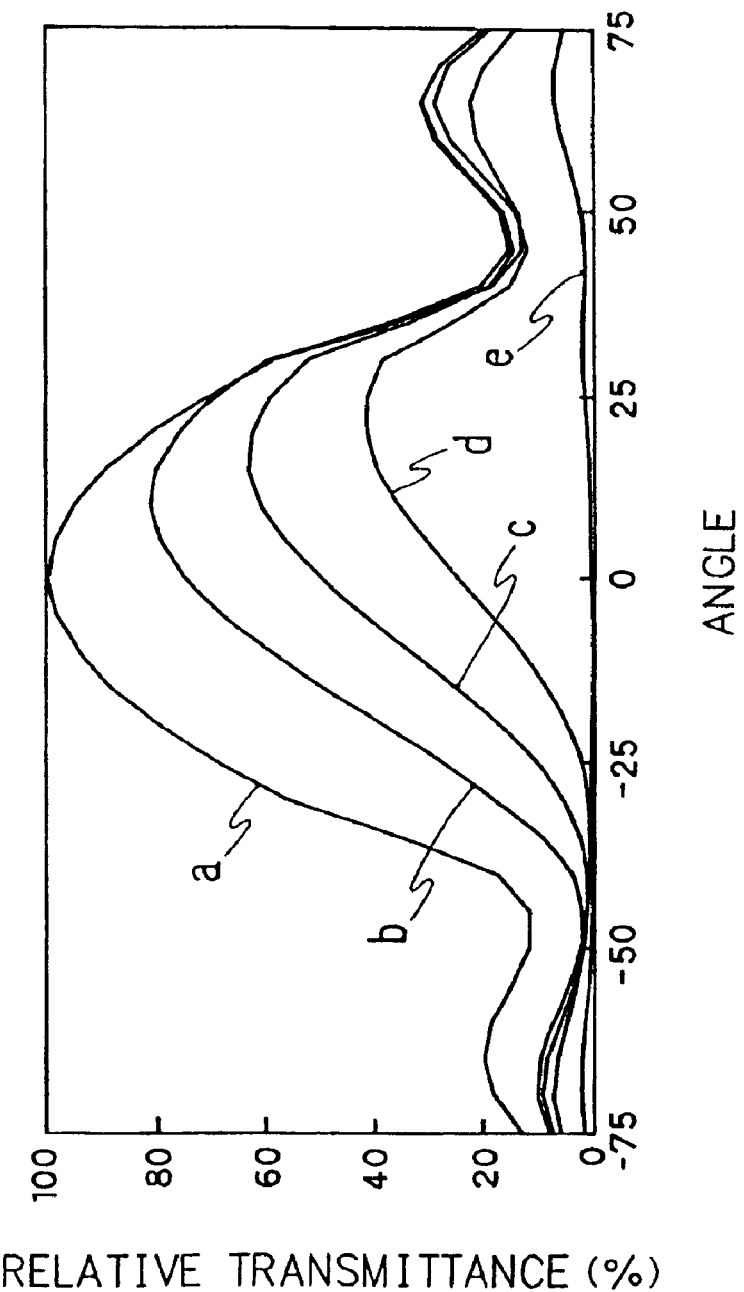
FIG. 15 is a diagram showing an angle dependence of the relative transmittance in the liquid crystal display device where the optical compensating film is not provided and which does not have the structure that the voltage to be applied to the liquid crystal varies in one pixel.
Figure 16:
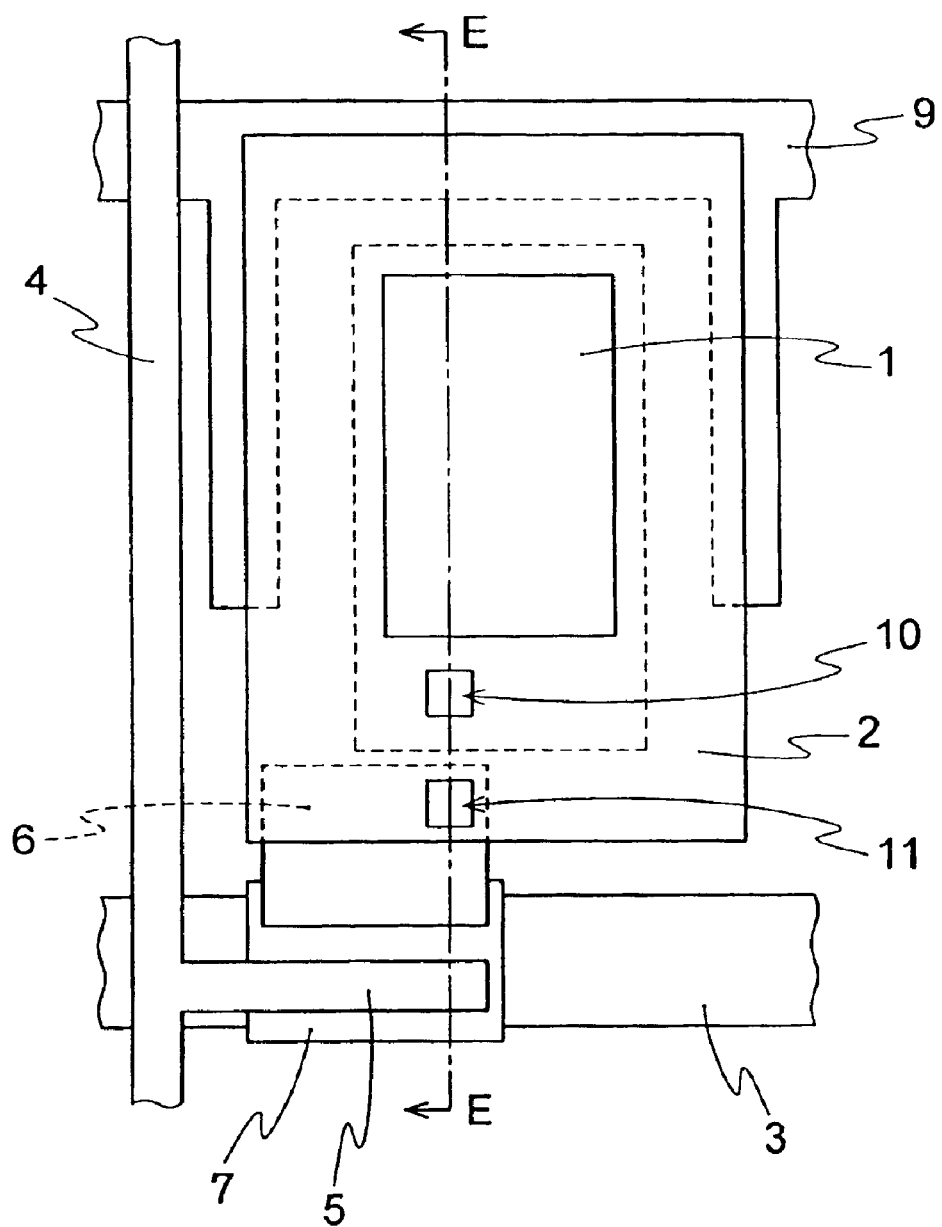
FIG. 16 is a plane view showing one pixel in a conventional liquid crystal display device.
Figure 17:
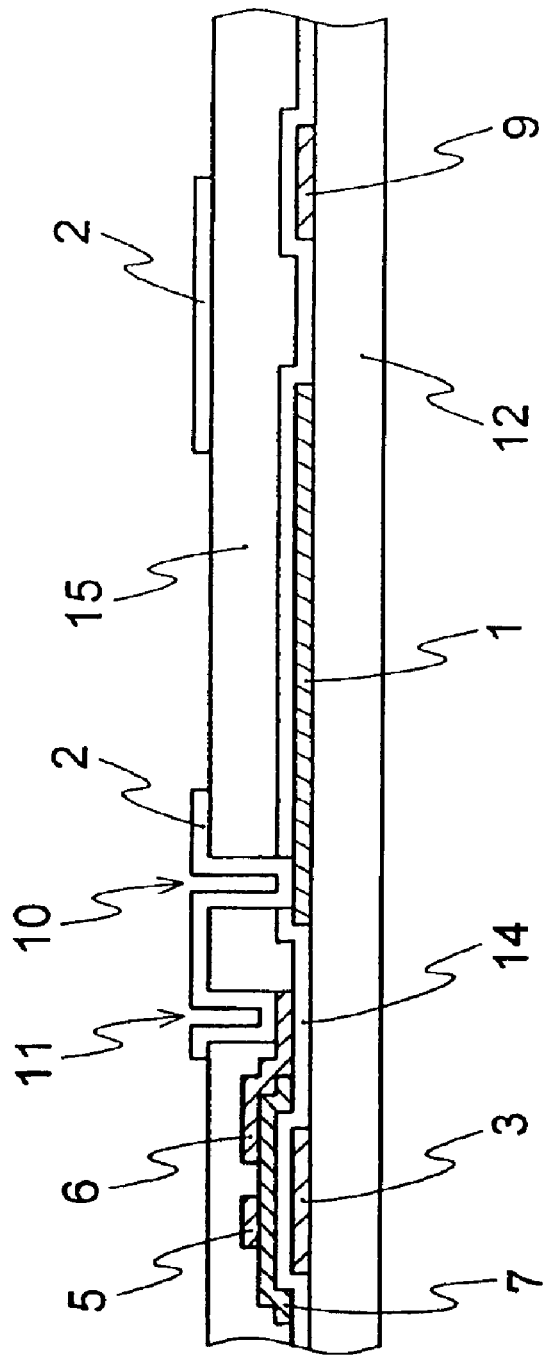
FIG. 17 is a sectional view taken along line E—E of FIG. 16 in the conventional liquid crystal display device.
Figure 18:
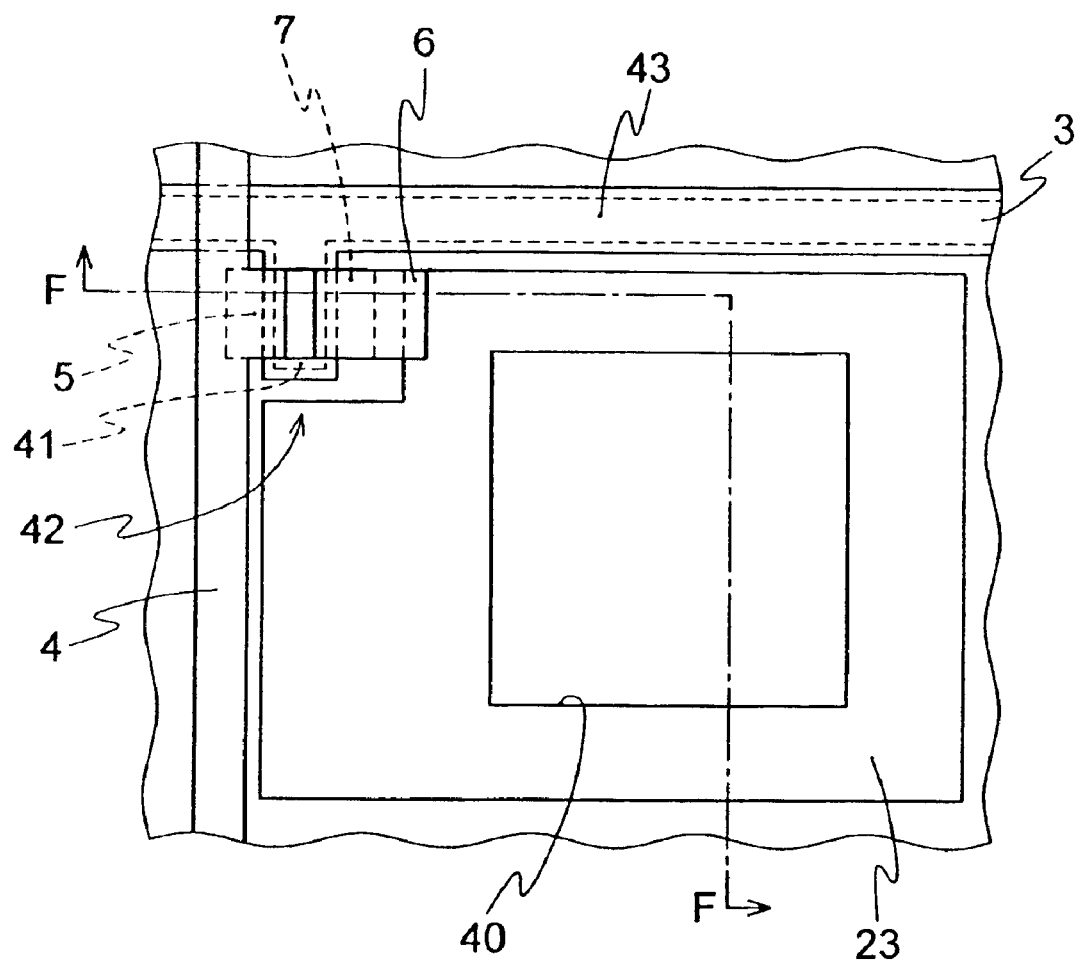
FIG. 18 is a plane view showing one pixel of a conventional liquid crystal display device.
Figure 19:
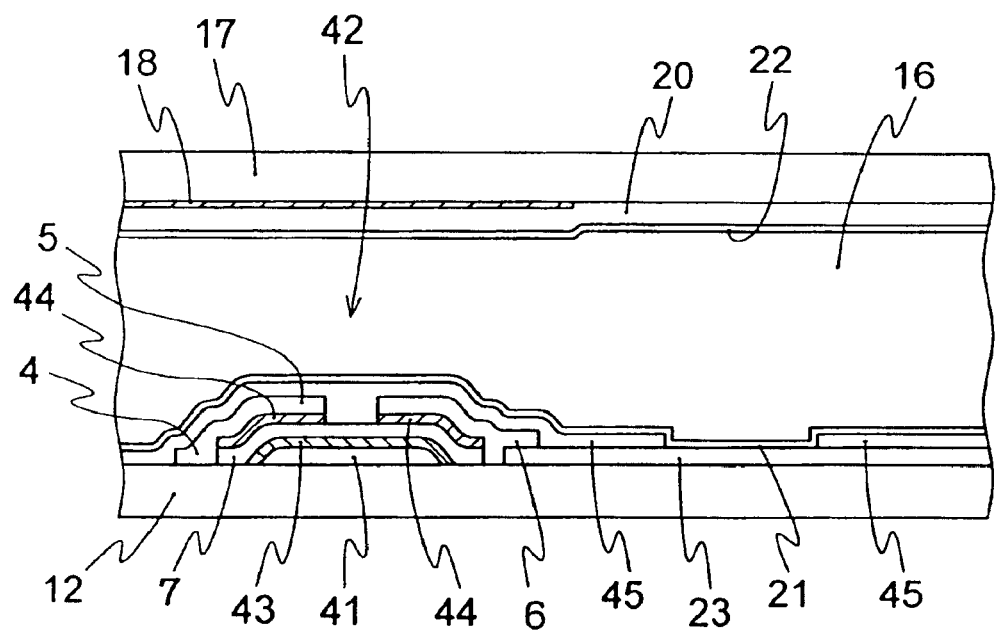
FIG. 19 is a sectional view taken along line F—F of FIG. 18 in the conventional liquid crystal display device.
Figure 20:
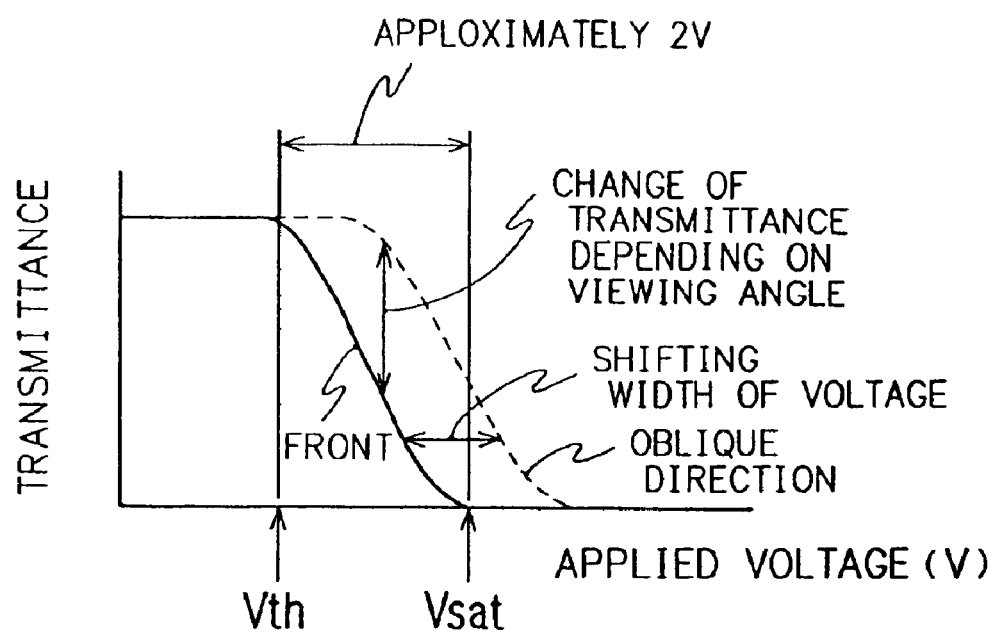
FIG. 20 is a diagram showing a relationship between a voltage to be applied to the liquid crystal and a transmittance in a TN type liquid crystal display device.
Figure 21A:
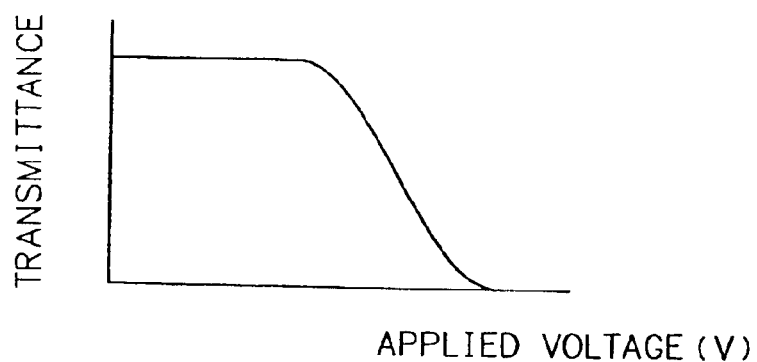
FIG. 21(a) is a diagram showing a relationship between the voltage to be applied the liquid crystal and the transmittance on a second pixel electrode in the TN type liquid crystal display device.
Figure 21B:
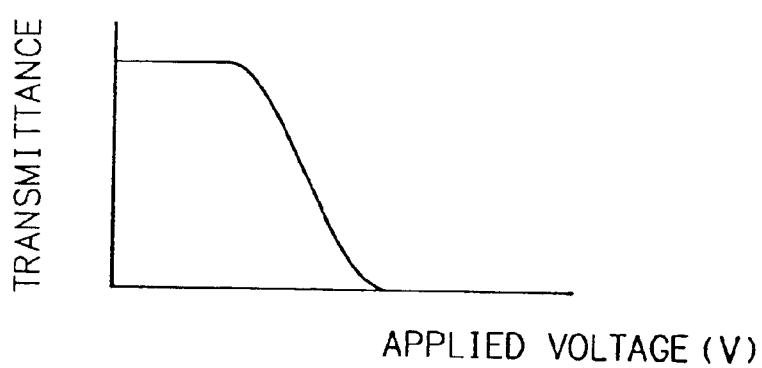
FIG. 21(b) is a diagram showing a relationship between the voltage to be applied to the liquid crystal voltage and the transmittance on a first pixel electrode.
Figure 21C:
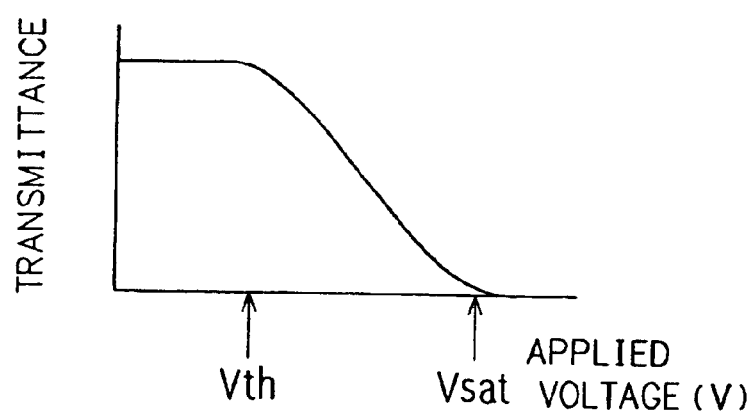
FIG. 21(c) is a diagram showing a characteristic in the case where
Figure 22:
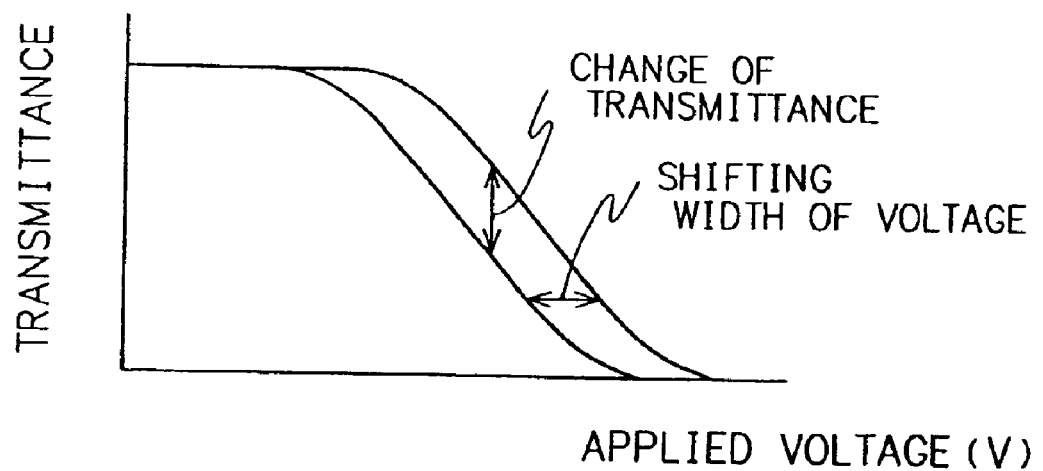
FIG. 22 is a diagram showing a relationship between the voltage to be applied to the liquid crystal and the transmittance in the conventional liquid crystal display device.
Figure 23:
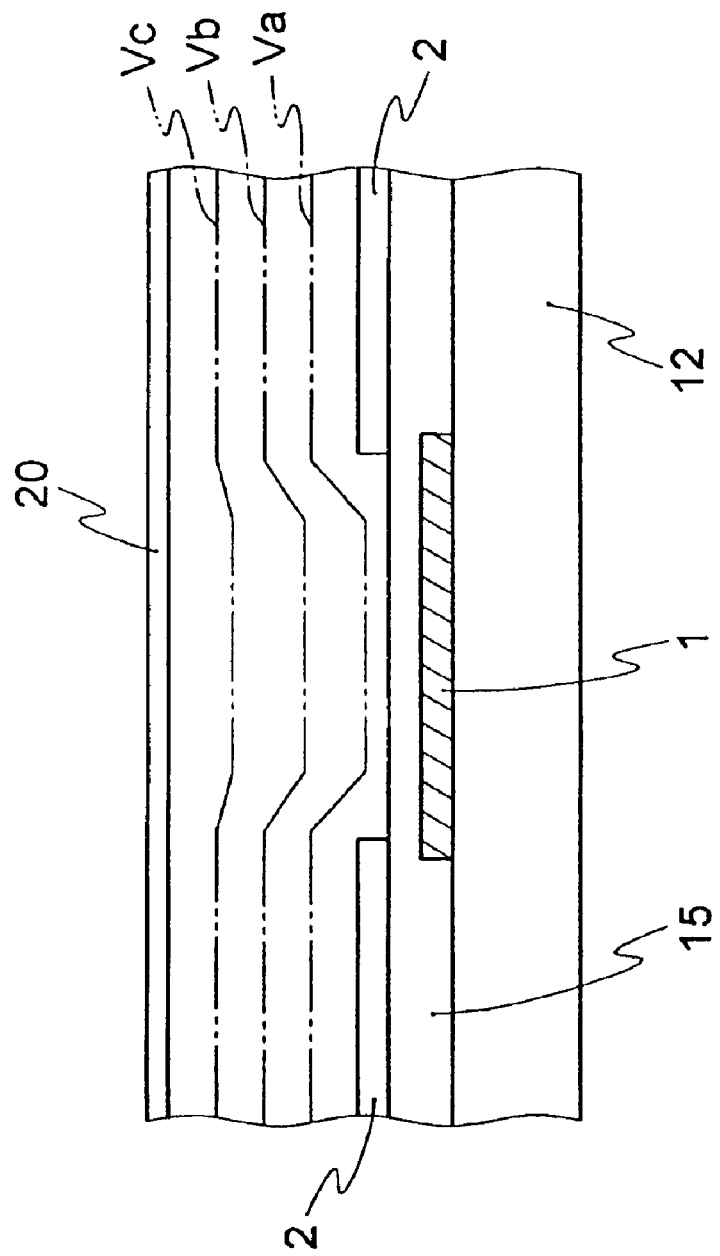
FIG. 23 is a diagram showing an equipotential surface in the vicinity of a pixel electrode opening portion.

There will be explained below the fifth embodiment of the present invention with reference to FIGS. 9 through 15. FIG. 9 is a structural diagram of the liquid crystal display device according to the fifth embodiment of the present invention. FIG. 10 is a diagram showing a relationship between retardation and measuring angle (viewing angle) of an optical compensating film. FIG. 11 is a diagram showing refractive indexes of discotic liquid crystal molecules in a radial direction and a thicknesswise direction. FIG. 12(a) is a diagram showing a relationship between a base material composing the optical compensating film and the discotic liquid crystal molecules, and FIG. 12(b) is a diagram showing refractive indexes of the optical compensating film inplane and in a normal direction. FIG. 13 is a diagram showing a relationship between relative transmittance on a display front surface and the viewing angle in an up-and-down direction in the liquid crystal display device according to the embodiment of the present invention. FIG. 14 is a diagram showing a relationship between the relative transmittance on the display front surface and the viewing angle in the up-and-down direction in the liquid crystal display device, which has the areas where the voltage to be applied to the liquid crystal voltage varies in one pixel and is provided with no optical compensating film. FIG. 15 is a diagram showing a relationship between the relative transmittance on the display front surface and the viewing angle in the up-and-down direction in the liquid crystal display device, which is provided with the optical compensating film and does not have the areas where the voltage to be applied to liquid crystal varies in one pixel.

In FIG. 9, numeral 27 is a polarizer on the array substrate side, numeral 28 is a polarizer on the counter substrate side, numeral 29 is an optical compensating film on the array substrate side, numeral 30 is an optical compensating film on the counter substrate side, numeral 31 is an array substrate, numeral 32 is a counter substrate, numeral 33 is a liquid crystal, numeral 34 is a rubbing direction of the array substrate 31, numeral 35 is a rubbing direction of the counter substrate 32, and numeral 36 is a back light. Numerals 27a and 28a show transmittance axial directions of the polarizers 27 and 28, and numerals 29a and 30a show tilt directions of the discotic liquid crystal. A driving circuit for driving pixels on the array substrate 31 is not shown.

The optical compensating films 29 and 30 are optical compensating films where an alignment state of the discotic liquid crystal is stabilized. The concrete structure of the optical compensating films is disclosed in, for example, Japanese Unexamined Patent Publication Nos. 50204/1996, 50270/1996, 95030/1996, 95034/1996 and 5524/1996. As for the optical compensating films 29 and 30, it is considered that the discotic liquid crystal is hybrid-aligned in such a manner that an angle of director (tilt angle of liquid crystal molecules) continuously changes in the thicknesswise direction.

For this reason, as shown in the diagram of FIG. 10 showing the relationship between retardation Re and measuring angle (viewing angle) of the optical compensating film, this relationship has the minimal value (about a several nm) such that the absolute value of the retardation is not zero in all directions, and the minimal value is measured in the range of 5 to 50° from the normal direction of the optical compensating film. Here, the measuring angle shows an angle in an arbitrary direction from the normal direction with respect to a plane of the optical compensating film. The measuring angle range of 5 to 50° is a expected range of continuously changed tilt direction of discotic liquid crystal (molecules) which is comprised the optical compensating film. When the measuring angle is out of this range, sufficient optical compensation is not made at the time of black display, and thus the viewing angle improving effect is lowered.

Refractive index anisotropy of the discotic liquid crystal is negative, namely, as schematically shown in FIG. 11, a refractive index nr of the discotic liquid crystal molecules 37 in the radial direction r and a refractive index nd in the thicknesswise direction d satisfy the relationship: nr>nd. For this reason, as for the whole optical compensating film, as shown in FIG. 12(a), when the tilt direction of the discotic liquid crystal molecules 37 with respect to the base material 38 is x, refractive indexes in directions x, y and z shown in FIG. 12(b) is nx, ny and nz, respectively. At this time, the refractive indexes nx and ny in the plane of the optical compensating film 39 and the refractive index nz in the thicknesswise direction satisfy the relationship: nx>ny>nz in order to fulfill the function of the optical compensating film. Directions that the tilt direction of the director is projected onto a film surface are represented by arrows on the optical compensating films 29 and 30 in FIG. 9.

In addition, it is desirable that a product $\Delta$nd (retardation) of birefringence index $\Delta$n of the liquid crystal 33 and a thickness d of the liquid crystal layer satisfies the relationship: $0.30 \mu m \leq \Delta nd \leq 0.50 \mu m$ because when $\Delta$nd is small, the contrast is lowered due to lowering of luminance at the time of white display, and when $\Delta$nd is large, the contrast is improved but a response speed is slow and the viewing angle becomes narrow. It is more preferable that $\Delta$nd satisfies the relationship: $0.34 \mu m \leq \Delta nd \leq 0.42 \mu m$.

Next, there will be explained below the liquid crystal display device manufacturing method according to the present embodiment with reference to FIG. 9. First, an alignment film is applied to surfaces of the array substrate 31 on which a plurality of pixels are arranged and and of the counter substrate 32 where the counter electrode (not shown) is formed in contact with the liquid crystal 33, and the films are subjected to a heat treatment at 200° C. for 30 minutes. The alignment films are subjected to a rubbing treatment such that the alignment directions of the liquid crystal form approximately 90° (a rubbing direction 34 of the array substrate and a rubbing direction 35 of the counter substrate form approximately 90°). Here, that the alignment directions of the liquid crystal form approximately 90° (a twist angle of the liquid crystal becomes approximately 90°) means that a twist angle of the liquid crystal interposed by the upper and lower substrate falls within the range of 70 to 100°. When the twist angle of the liquid crystal is out of the range of 70 to 100°, satisfactory white display in the normally white mode cannot be obtained, and when the angle falls within the above range, satisfactory voltage to be applied to the liquid crystal-transmittance characteristic can be obtained as the liquid crystal display device in the normally white mode.

In addition, it is preferable that a pretilt angle of the liquid crystal is 3 to 9°. When the pretilt angle is smaller than 3°, an alignment disorder area is easily generated on a pixel effective display portion, and the display quality is deteriorated. Meanwhile, when the pretilt angle is larger than 9°, the transmittance in the white display is lowered so that display luminance is lowered and contrast is lowered.

Thereafter, a spacer composed of plastic beads or the like is dispersed onto one of the substrates such that the thickness of the liquid crystal becomes, for example, 4.3 $\mu$m, and the array substrate 31 and the counter substrate 32 are overlapped. At this time, the substrates are surrounded by a seal material except for a part of their periphery, and after the liquid crystal 33 is injected into the substrates by a vacuum injecting method, the substrates are sealed. The injected liquid crystal 33 having birefringence index $\Delta$n=0.089 is used. Next, the polarizer 27 on the array substrate side and the polarizer 28 on the counter substrate side, to which the optical compensating film 29 on the array substrate side and the optical compensating film 30 on the counter substrate side are provided, are stuck to the surfaces of the array substrate 31 and the counter substrate 32 which are opposite to the surfaces in contact with the liquid crystal 33 so that the rubbing directions 34 and 35 match with the tilt directions of the discotic liquid crystal respectively. Here, the transmission axes of the polarizer 27 on the array substrate side and the polarizer 28 on the counter substrate side form approximately 90°. When the angle formed by the transmission axes of the polarizer 27 on the array substrate side and the polarizer 28 on the counter substrate side greatly deviates from 90°, a transmitted light amount at the time of black display increases, and thus there arises problems that display becomes whitish and the contrast is lowered. For this reason, the transmission axes are set to form approximately 90° (orthogonal) so that a transmitted light amount at the time of black display is reduced and the contrast can be improved. Thereafter, the driving circuit, not shown, is mounted to be combined with the backlight so that the liquid crystal display device of normally white mode is finished.

With the above structure, as shown in FIG. 13 (respective curved lines a, b, c, d and e in the drawing show relationships when voltages are applied so that the relative transmittance becomes 100%, 75%, 50%, 25% and 0% (black display) from the top at the angle of 0), the relative transmittance of half tone in a downward direction does not cross until about −50°, and as a result it is found that inversion does not occur until around this angle.

FIG. 14 is a diagram showing a relationship between the relative transmittance on the display front surface and the viewing angle in the up-and-down direction in the liquid crystal display device which has the areas where the voltage to be applied to the liquid crystal varies in one pixel and optical compensating film is not provided. Respective curved lines in the drawing a, b, c, d and e show relationships when voltages are applied so that the relative transmittance becomes 100%, 75%, 50%, 25% and 0% (black display) from the top at the angle of 0. As apparent from FIG. 14, in the case where the areas where the voltage to be applied to the liquid crystal varies are provided in one pixel and the optical compensating film is not provided, relative luminance curved lines do not cross until around the angle of −25°, and inversion does not occur until this angle. As a result, it is confirmed that an angle at which gray scale inversion occurs is clearly wider downwards by adding the optical compensating film.

FIG. 15 is a diagram showing a relationship between the relative transmittance on the display front surface and the viewing angle in the up-and-down direction in the liquid crystal display device which is provided with the optical compensating film and does not have the areas where the voltage to be applied to liquid crystal varies in one pixel. Respective curved lines in the drawing a, b, c, d and e show relationships when voltages are applied so that the relative transmittance becomes 100%, 75%, 50%, 25% and 0% (black display) from the top at the angle of 0°. As apparent from FIG. 15, in the case where the optical compensating film is provided and the areas where the voltage to be applied to the liquid crystal varies is not provided to one pixel, respective relative luminance curved lines do not cross until around angle of −45°, namely, inversion does not occur until this angle. As a result, when the voltage to be applied to the areas where the voltage to be applied to the liquid crystal varies is provided to one pixel, it is confirmed that the angle at which gray scale inversion occurs becomes wider downwards.

The reason that such a result is obtained is as follows. The liquid crystal is combined with the optical compensating film so that optical compensation is carried out, but in the case where the liquid crystal display device in a state of black or half tone display is viewed aslant, there exists retardation which cannot be optically compensated depending on the combinations. However, when the areas where the voltage to be applied to the liquid crystal varies are provided to one pixel, the effect which modifies the slant of the gray scale luminance characteristic (relative transmittance characteristic) is added so that the angle at which the gray scale inversion occurs can be widened downward.

In the liquid crystal display device of the present embodiment, the structures in the first through fourth embodiments are combined variously to be applied so that the viewing angle can be widened downward, and the light leakage from the boundary portion of the areas where the voltage to be applied to the liquid crystal varies in one pixel and also the light leakage on the contact hole for connecting the first pixel electrode and the second pixel electrode are prevented. As a result, the contrast can be improved.

As mentioned above, the present embodiment explained the improvement of the viewing angle using the optical compensating film, but the present invention is not limited to the film structure and the material structure in the present embodiment and it can be modified variously within the range where it does not deviate from the gist.

The first liquid crystal display device of the present invention has a plurality of pixels provided on an insulating substrate, a scanning line provided on the insulating substrate which scans the pixels, liquid crystal which is interposed between the insulating substrate and a counter substrate countered to the insulating substrate, and areas where a voltage to be applied to the liquid crystal varies in one pixel. A light shielding film for preventing a light leakage due to alignment disorder of the liquid crystal is provided to a boundary portion of the areas where the voltage to be applied to the liquid crystal varies. As a result, the viewing angle can be widened and the contrast can be improved.

The second liquid crystal display device of the present invention is formed that the pixels are composed of a first pixel electrode and a second pixel electrode connected via an insulating film in the areas where the voltage to be applied to the liquid crystal varies in one pixel, and the second pixel electrode is provided on a layer above the insulating film provided on a layer above the first pixel electrode and by having an area where it is not overlapped on the first pixel electrode in the first liquid crystal display device. As a result, the viewing angle can be widened and the contrast can be improved.

The third liquid crystal display device of the present invention is formed that the areas where the voltage to be applied to the liquid crystal varies in one pixel are formed that an insulating film on pixel electrodes composing the pixels and a part of the insulating film on the pixel electrodes is removed in the first liquid crystal display device. As a result, the viewing angle can be widened and the contrast can be improved.

In the fourth liquid crystal display device of the present invention, the light shielding film is formed by a conductive film on the same layer as the scanning line in the first, second or third liquid crystal display device. As a result, the viewing angle can be widened and the contrast can be improved, and further the manufacturing steps can be simplified.

In the fifth liquid crystal display device of the present invention, the light shielding film is formed integrally with a storage capacitance line provided in parallel with the scanning line in the first, second or third liquid crystal display device. As a result, the viewing angle can be widened, the contrast can be improved, and further the manufacturing steps can be simplified, an aperture ratio can be higher and a storage capacitance can be secured sufficiently.

In the sixth liquid crystal display device of the present invention, the light shielding film is formed in a position where a light leakage due to alignment disorder of the liquid crystal due to the alignment treatment is prevented in one of the first through fifth liquid crystal display device. As a result, the viewing angle can be widened, the light leakage due to the alignment disorder due to the alignment treatment can be prevented, and the contrast can be improved.

In the seventh liquid crystal display device of the present invention, a ratio of the voltage to be applied to the liquid crystal between the first pixel electrode and a counter electrode formed on a surface on the counter substrate in contact with the liquid crystal to the voltage to be applied to the liquid crystal between the second pixel electrode and the counter electrode falls within the range of 0.5:1.0 to 0.9:1.0 in the second liquid crystal display device. As a result, the viewing angle can be widened and the contrast can be improved.

In the eighth liquid crystal display device of the present invention, a ratio of the voltage to be applied to liquid crystal between the pixel electrode where a part of the insulating film is removed and the counter electrode formed on the surface on the counter substrate in contact with the voltage to be applied to the liquid crystal to voltage to be applied to the liquid crystal between the insulating film on the pixel electrode and the counter electrode falls within the range of 0.5:1.0 to 0.9:1.0 in the third liquid crystal display device. As a result, the viewing angle can be further widened and the contrast can be further improved.

In the ninth liquid crystal display device of the present invention, the first pixel electrode is connected with the second pixel electrode by forming a contact hole on the insulating film, and the light shielding film for preventing the alignment disorder of the liquid crystal is provided to the contact hole portion in the second or seventh liquid crystal display device. As a result, the viewing angle can be widened, the light leakage due to the alignment disorder due to the alignment treatment can be prevented, and the contrast can be further improved.

In the tenth liquid crystal display device of the present invention, the light shielding film for preventing the alignment disorder of the liquid crystal on the contact hole portion is formed by a black matrix on the counter substrate in the ninth liquid crystal display device. As a result, the viewing angle can be widened, the contrast can be improved, and the manufacturing steps can be simplified.

In the eleventh liquid crystal display device of the present invention, the light shielding film for preventing the alignment disorder of the liquid crystal on the contact hole portion is formed by an opaque film on the insulating substrate in the ninth liquid crystal display device. As a result, the viewing angle can be widened and the contrast can be improved.

The twelfth liquid crystal display device of the present invention further has alignment films which are provided respectively on surfaces of the insulating substrate and the counter substrate in contact with the liquid crystal and aligns the liquid crystal, polarizers which are provided respectively on surfaces of the insulating substrate and the counter substrate opposite to the surface in contact with the liquid crystal, and optical compensating films which are provided between the polarizers and the insulating substrates and the counter substrate and fixes an alignment state of the liquid crystal in one of the first through eleventh liquid crystal display device. As a result, the viewing angle can be further widened and the contrast can be improved.

In the thirteenth liquid crystal display device of the present invention, a product of a birefringence index $\Delta n$ of the liquid crystal and a thickness d of the liquid crystal layer satisfies the relationship: $0.30 \ \mu m \leq \Delta n d \leq 0.50 \ \mu m$ in the twelfth liquid crystal display device. As a result, the viewing angle can be further widened and the contrast can be further improved.

The first liquid crystal display device manufacturing method of the present invention, the liquid crystal display device having a plurality of pixels provided on an insulating substrate, a scanning line provided on the insulating substrate to scan the pixels, and liquid crystal which is interposed between the insulating substrate and a counter substrate countered to the insulating substrate, the method includes the steps of forming areas where a voltage to be applied to the liquid crystal varies on one pixel, and forming a light shielding film for preventing a light leakage due to alignment disorder of the liquid crystal on a boundary portion of the areas where the voltage to be applied to the liquid crystal varies. As a result, the liquid crystal display device where the viewing angle is widened and the contrast is improved can be obtained.

In the second liquid crystal display device manufacturing method of the present invention, the step of forming the areas where the voltage to be applied to the liquid crystal varies on one pixel includes the steps of forming a first pixel electrode, forming an insulating film on a layer above the first pixel electrode, forming a contact hole on the insulating film, and forming a second pixel electrode which has an area where it is not overlapped on the first pixel electrode on a layer above the insulating film and is connected with the first pixel electrode via the contact hole in the first liquid crystal display device manufacturing method. As a result, the liquid crystal display device where the viewing angle is widened and the contrast is improved can be obtained.

In the third liquid crystal display device manufacturing method of the present invention, the step of forming the areas where the voltage to be applied to the liquid crystal varies on one pixel includes the steps of forming a pixel electrode, forming an insulating film on a layer above the pixel electrode, and removing a part of the insulating film from the pixel electrode in the first liquid crystal display device manufacturing method. As a result, the liquid crystal display device where the viewing angle is widened and the contrast is improved can be obtained.

The fourth liquid crystal display device manufacturing method of the present invention further includes the step of forming a light shielding film for preventing alignment disorder of the liquid crystal on the contact hole portion in the second liquid crystal display device manufacturing method. As a result, the liquid crystal display device where the viewing angle is widened and the contrast is further improved can be obtained.

What is claimed is:

1. A liquid crystal display device comprising a plurality of pixels provided on an insulating substrate, a scanning line provided on the insulating substrate which scans the pixels, a liquid crystal which is interposed between the insulating substrate and a counter substrate countered to the insulating substrate, and display areas within one pixel where an electric field applied to the liquid crystal varies by a two-layer pixel electrode, and is characterized in that at least one light shielding film for preventing a light leakage due to an alignment disorder of the liquid crystal is provided to a boundary portion of the display areas where said electric field is applied to the liquid crystal.

2. A method for manufacturing a liquid crystal device where said liquid crystal device comprising a plurality of pixels provided on an insulating substrate, a scanning line provided on the insulating substrate to scan the pixels, and a liquid crystal which is interposed between the insulating substrate and a counter substrate countered to the insulating substrate, said method comprising the steps of:

forming display areas within one pixel where an electric field applied to the liquid crystal varies by a two-layer pixel electrode; and forming at least one light shielding film for preventing a light leakage due to an alignment disorder of the liquid crystal on a boundary portion of the display areas where said electric field is applied to the liquid crystal.

3. A liquid crystal display device comprising a plurality of pixels provided on an insulating substrate, a scanning line provided on the insulating substrate which scans the pixels, a liquid crystal which is interposed between the insulating substrate and a counter substrate countered to the insulating substrate, and display areas within one pixel where an electric field applied to the liquid crystal varies, and is characterized in that at least one light shielding film for preventing a light leakage due to an alignment disorder of the liquid crystal is provided to a boundary portion of the display areas where an electric field applied to the liquid crystal varies, wherein the pixels are comprised of a first pixel electrode and a second pixel electrode connected via an insulating film in the display areas where the electric field to be applied to the liquid crystal varies in within one pixel, and the second pixel electrode is provided on a layer above the insulating film provided on a layer above the first pixel electrode, the second pixel electrode comprises an area where the area is not overlapped on the first pixel electrode.

4. The liquid crystal display device of claim 3, wherein the at least one light shielding film is formed by a conductive film on the same layer as the scanning line.

5. The liquid crystal display device of claim 3, wherein the at least one light shielding film is formed integrally with a storage capacitance line provided in parallel with the scanning line.

6. The liquid crystal display device of claim 3, wherein a ratio of the electric field to be applied to a liquid crystal between the first pixel electrode and a counter electrode formed on a surface on the counter substrate in contact with the liquid crystal to the electric field applied to a liquid crystal between the second pixel electrode and the counter electrode falls within a range of 0.5:1.0 to 0.9:1.0.

7. The liquid crystal display device of claim 3, wherein the first pixel electrode is connected with the second pixel electrode by forming a contact hole on the insulating film, and the light shielding film for preventing the light leakage due to the alignment disorder of the liquid crystal is provided to the contact hole.

8. The liquid crystal display device of claim 7, wherein the light shielding film for preventing the light leakage due to the alignment disorder of the liquid crystal on the contact hole is formed by a black matrix on the counter substrate.

9. The liquid crystal display device of claim 7, wherein the light shielding film for preventing the light leakage due to the alignment disorder of the liquid crystal on the contact hole is formed by an opaque film on the insulating substrate.

10. The liquid crystal display device of claim 3, wherein the at least one light shielding film is formed in a position where the light leakage due to the alignment disorder of the liquid crystal due to the alignment treatment is prevented.

11. The liquid crystal display device of claim 3 further comprising alignment films which are provided respectively on surfaces of the insulating substrate and the counter substrate in contact with the liquid crystal and align the liquid crystal, polarizers which are provided respectively on surfaces of the insulating substrate and the counter substrate opposite to the surface in contact with the a discotic liquid crystal, and optical compensating films which are provided respectively between the polarizer and the insulating substrate, between the polarizer and the counter substrate where an alignment state of the a further liquid crystal in the optical compensating films is stabilized.

12. The liquid crystal display device of claim 11, wherein a product of a birefringence index $\Delta n$ of the liquid crystal and a thickness d of the liquid crystal satisfies a relationship: $0.30 \, \mu m \leq \Delta nd \leq 0.50 \, \mu m$.

13. The liquid crystal display of claim 12, wherein the further liquid crystal is a discotic liquid crystal.

14. A method for manufacturing a liquid crystal device where said liquid crystal device comprising a plurality of pixels provided on an insulating substrate, a scanning line provided on the insulating substrate to scan the pixels, and liquid crystal which is interposed between the insulating substrate and a counter substrate countered to the insulating substrate, said method comprising the steps of:

forming display areas within one pixel where an electric field applied to the liquid crystal varies; and forming at least one light shielding film for preventing a light leakage due to alignment disorder of the liquid crystal on a boundary portion of the display areas where the electric field applied to the liquid crystal varies, wherein said step of forming the display areas within one pixel where the electric field applied to the liquid crystal varies comprises steps of forming a first pixel electrode, forming an insulating film on a layer above the first pixel electrode, forming a contact hole on the insulating film, and forming a second pixel electrode which has an area where it is not overlapped on the first pixel electrode on a layer above the insulating film and is connected with the first pixel electrode via the contact hole.

15. The method of claim 14, further comprising a step of forming a light shielding film for preventing the light leakage due to the alignment disorder of the liquid crystal on the contact hole.

16. A liquid crystal display device comprising a plurality of pixels provided on an insulating substrate, a scanning line provided on the insulating substrate which scans the pixels, a liquid crystal which is interposed between the insulating substrate and a counter substrate countered to the insulating substrate, and display areas within one pixel where an electric field applied to the liquid crystal varies, and is characterized in that at least one light shielding film for preventing a light leakage due to alignment disorder of the liquid crystal is provided to a boundary portion of the display areas where an electric field applied to the liquid crystal varies, wherein the display areas within one pixel where the electric field applied to the liquid crystal varies are formed that an insulating film is formed on pixel electrodes comprising the pixels and a part of the insulating film on the pixel electrodes is removed and a ratio of the electric field applied to the liquid crystal between the pixel electrode where a part of the insulating film is removed and the counter electrode formed on the surface on the counter substrate in contact with the liquid crystal to the electric field applied to the liquid crystal between the insulating film on the pixel electrode and the counter electrode falls within a range of 0.5:1.0 to 0.9:1.0.

17. A liquid crystal display device comprising a plurality of pixels provided on an insulating substrate, a scanning line provided on the insulating substrate which scans the pixels, a liquid crystal which is interposed between the insulating substrate and a counter substrate countered to the insulating substrate, and display areas within one pixel where an electric field applied to the liquid crystal varies, and is characterized in that at least one light shielding film or a plurality of light shielding films for preventing a light leakage due to an alignment disorder of the liquid crystal is provided to a boundary portion of the display areas where an electric field applied to the liquid crystal varies, wherein the at least one light shielding film or at least one of the plurality of the light shielding films is formed integrally with a storage capacitance line provided in parallel with the scanning line, and wherein the display areas within one pixel where the electric field applied to the liquid crystal varies are formed that an insulating film is formed on pixel electrodes comprising the pixels and a part of the insulating film on the pixel electrodes is removed.

18. A method for manufacturing a liquid crystal device where said liquid crystal device comprising a plurality of pixels provided on an insulating substrate, a scanning line provided on the insulating substrate to scan the pixels, and liquid crystal which is interposed between the insulating substrate and a counter substrate countered to the insulating substrate, said method comprising the steps of:

forming display areas within one pixel where an electric field applied to the liquid crystal varies; and forming at least one light shielding film or a plurality of light shielding films for preventing a light leakage due to alignment disorder of the liquid crystal on a boundary portion of the display areas where the electric field applied to the liquid crystal varies, wherein the at least one light shielding film or at least one of the plurality of the light shielding films is formed integrally with a storage capacitance line provided in parallel with the scanning line, wherein said step of forming the display areas within one pixel where the electric field applied to the liquid crystal varies comprises steps of forming a pixel electrode, forming an insulating film on a layer above the pixel electrode, and removing a part of the insulating film from the pixel electrode.

19. A liquid crystal display device comprising a plurality of pixels provided on an insulating substrate, a scanning line provided on the insulating substrate which scans the pixels, a liquid crystal which is interposed between the insulating substrate and a counter substrate countered to the insulating substrate, and display areas within one pixel where an electric field applied to the liquid crystal varies, and is characterized in that at least one light shielding film or a plurality of light shielding films for preventing a light leakage due to an alignment disorder of the liquid crystal is provided to a boundary portion of the display areas where an electric field applied to the liquid crystal varies, wherein the at least one light shielding film or at least one of the plurality of the light shielding films is formed integrally with a storage capacitance line provided in parallel with the scanning line, and wherein the at least one light shielding film is formed in a position where the light leakage due to the alignment disorder of the liquid crystal due to the alignment treatment is prevented.

20. A liquid crystal display device comprising a plurality of pixels provided on an insulating substrate, a scanning line provided on the insulating substrate which scans the pixels, a liquid crystal which is interposed between the insulating substrate and a counter substrate countered to the insulating substrate, and display areas within one pixel where an electric field applied to the liquid crystal varies, and is characterized in that at least one light shielding film or a plurality of light shielding films for preventing a light leakage due to an alignment disorder of the liquid crystal is provided to a boundary portion of the display areas where an electric field applied to the liquid crystal varies, wherein the at least one light shielding film or at least one of the plurality of the light shielding films is formed integrally with a storage capacitance line provided in parallel with the scanning line, and wherein the liquid crystal display device further comprises alignment films which are provided respectively on surfaces of the insulating substrate and the counter substrate in a contact with the liquid crystal and align the liquid crystal, polarizers which are provided respectively on the surfaces of the insulating substrate and the counter substrate opposite to the surface in contact with the liquid crystal, and optical compensating films which are provided respectively between the polarizer and the insulating substrate, between the polarizer and the counter substrate where an alignment state of a further liquid crystal in the optical compensating films is stabilized, and further wherein a product of a birefringence index $\Delta n$ of the liquid crystal and a thickness d of the liquid crystal satisfies a relationship: $0.30\ \mu m \leq \Delta nd \leq 0.50\ \mu m$.

* * * * *

UNITED STATES PATENT AND TRADEMARK OFFICE
CERTIFICATE OF CORRECTION

PATENT NO. : 6,912,034 B2
DATED : June 28, 2005
INVENTOR(S) : Shingo Nagano and Masaya Mizunuma It is certified that error appears in the above-identified patent and that said Letters Patent is hereby corrected as shown below:

Title page,
Item [56], References Cited, U.S. PATENT DOCUMENTS, add:
-- US  6,583,836 B2       6/2003     Kim et al.
   US  6,400,440 B1       6/2002     Colgan et al.
   US  6,061,113 A        5/2000     Kawata, Ken
   US  2003/0081159 A-1   5/2003     Ha et al --.
FOREIGN PATENT DOCUMENTS, delete:
second "08005524    1/1996" reference;
second "08050204    2/1996" reference;
second "08050270    2/1996" reference;
second "08095030    5/1996" reference;
second "08095034    4/1996" reference --.

Column 19,
Line 6, "in" should be deleted.
Line 53, "the" should be deleted.
Line 59, after "display", -- device -- should be inserted.

Signed and Sealed this

Twenty-first Day of February, 2006

JON W. DUDAS
*Director of the United States Patent and Trademark Office*